(12) United States Patent
Chappell

(10) Patent No.: US 7,958,645 B1
(45) Date of Patent: Jun. 14, 2011

(54) UNIVERSAL FRAMING SQUARE

(75) Inventor: Steve K. Chappell, Brownfield, ME (US)

(73) Assignee: Chappell Universal Square & Rule Co. LLC., Brownfield, ME (US)

( * ) Notice: Subject to any disclaimer, the term of this patent is extended or adjusted under 35 U.S.C. 154(b) by 0 days.

(21) Appl. No.: 12/724,943

(22) Filed: Mar. 16, 2010

(51) Int. Cl.
*B43L 7/027* (2006.01)

(52) U.S. Cl. .......................................... 33/476; 33/474

(58) Field of Classification Search .................... 33/418, 33/421, 423, 427, 429, 474, 476, 494
See application file for complete search history.

(56) References Cited

U.S. PATENT DOCUMENTS

| | | | | |
|---|---|---|---|---|
| 247,353 | A | | 9/1881 | Howard |
| 492,532 | A | * | 2/1893 | Gilmer ........................ 33/421 |
| 651,057 | A | | 6/1900 | Roberts |
| 672,455 | A | | 4/1901 | Nicholls |
| 691,192 | A | | 1/1902 | Smith et al. |
| 937,202 | A | | 10/1909 | Bailey |
| 1,102,689 | A | | 7/1914 | Sargent |
| 1,196,519 | A | | 8/1916 | Caylor |
| 1,236,817 | A | | 8/1917 | Bick |
| 1,241,976 | A | | 10/1917 | Hill |
| 1,463,605 | A | | 7/1923 | Walters |
| 1,477,002 | A | | 12/1923 | Parkhill |
| 1,704,462 | A | | 3/1929 | Crandlemere |
| 2,654,954 | A | * | 10/1953 | Lawrence ........................ 33/423 |
| 4,200,990 | A | | 5/1980 | West |
| 4,420,891 | A | * | 12/1983 | Orem ............................... 33/476 |
| 5,727,325 | A | * | 3/1998 | Mussell .......................... 33/429 |
| 6,105,266 | A | * | 8/2000 | Cote ............................... 33/427 |
| 6,725,555 | B1 | * | 4/2004 | Moore ............................ 33/423 |
| 6,868,616 | B2 | * | 3/2005 | Allemand ...................... 33/476 |
| 7,854,070 | B1 | * | 12/2010 | Vajentic ......................... 33/421 |

* cited by examiner

Primary Examiner — G. Bradley Bennett
(74) Attorney, Agent, or Firm — Pierce Atwood LLP; Kevin M. Farrell; Katherine A. Wrobel

(57) ABSTRACT

The Chappell Universal Square™ solves the problems associated with standard framing squares and provides a dynamic framing square bearing novel indicia and a novel arrangement of same for direct application to framing members during construction of complicated framing systems of equal and/or unequal pitched members. Typically, squares are limited to use with a single base unit of measurement, e.g. inches or millimeters, and provide limited tabulated information for use in calculating lengths, distances, and angles at which to cut framing members. The present invention is a tool that provides universal applicability for use in building both simple and complex structures according to metric and standard/imperial measurement systems. The present invention provides tabulated calculations aligned with indicia that enable construction of equal and complex unequal pitch framing members without necessitating the execution of complex trigonometric calculations.

14 Claims, 12 Drawing Sheets

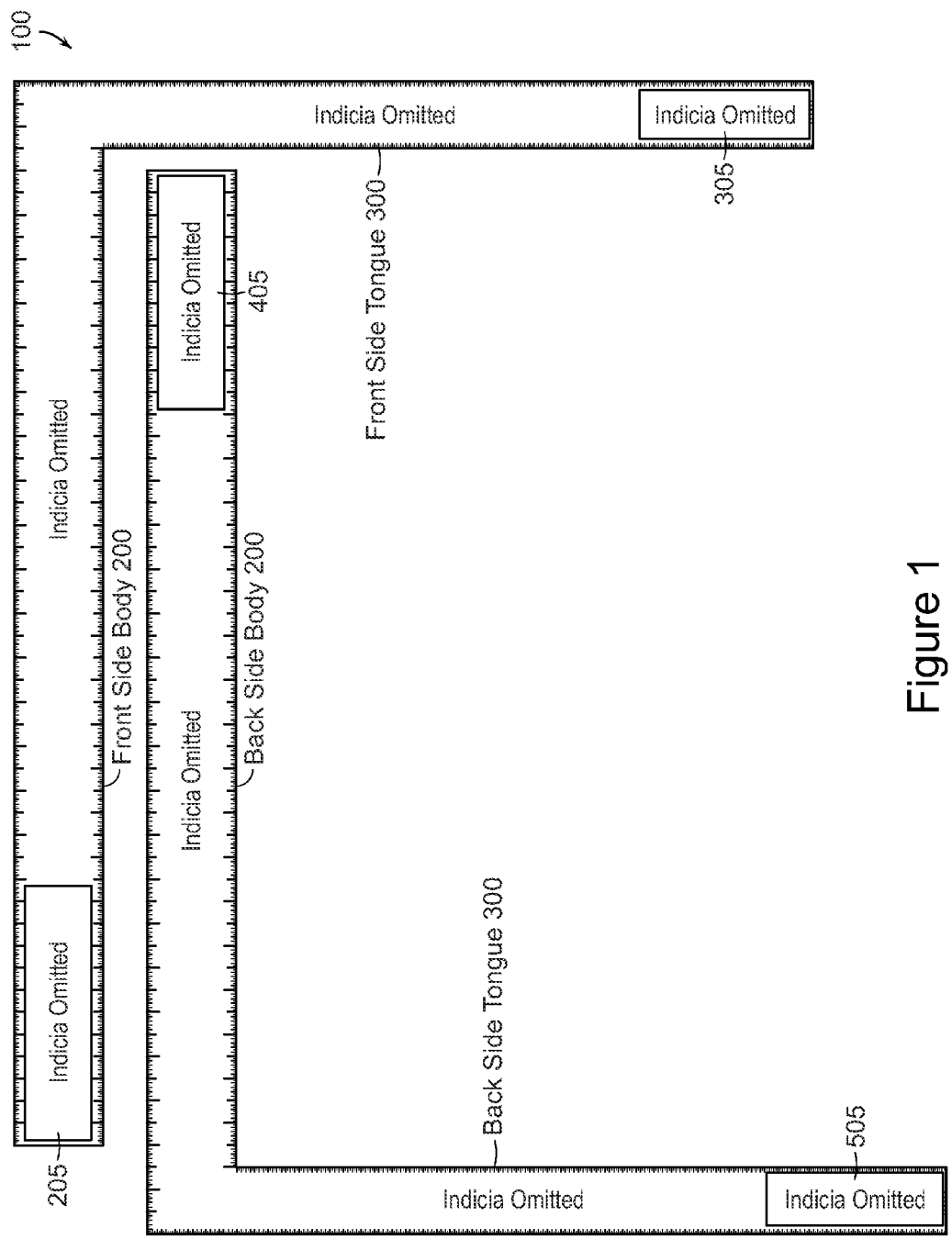

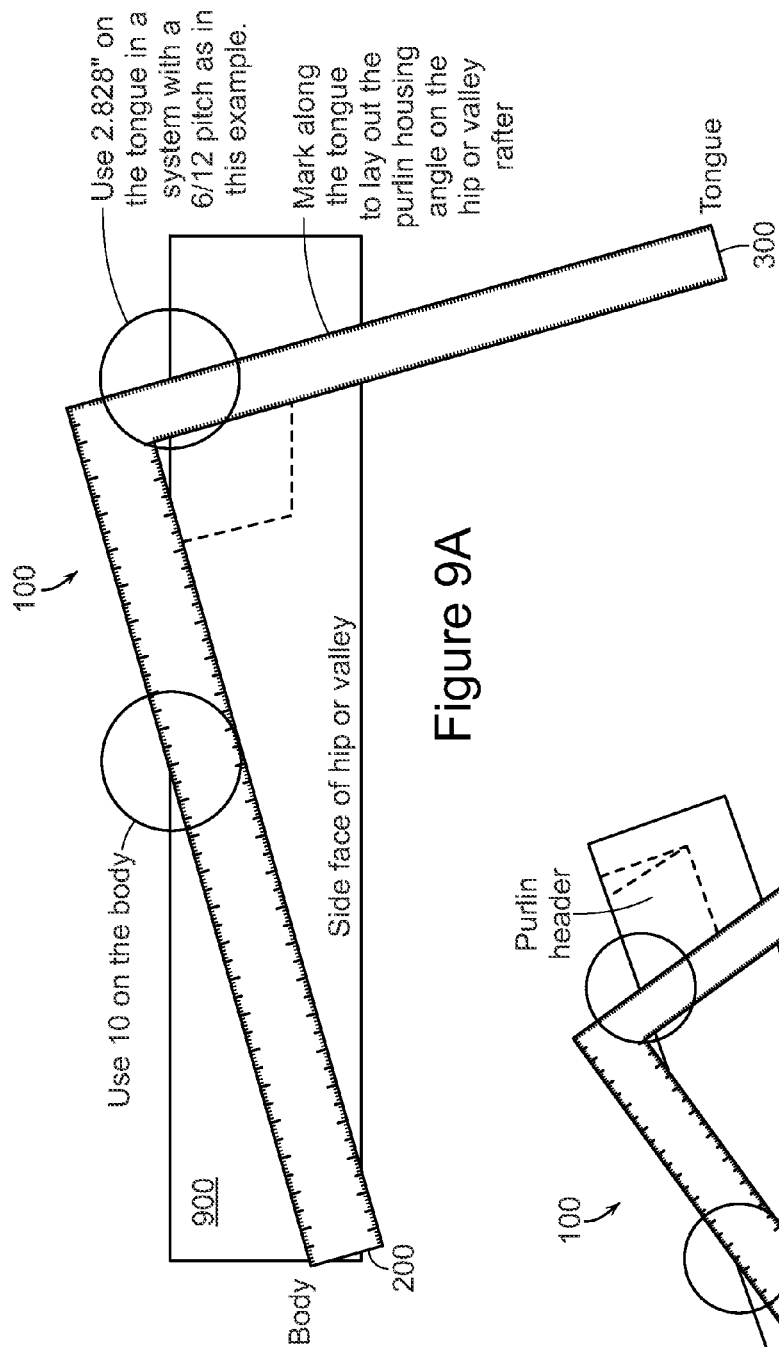
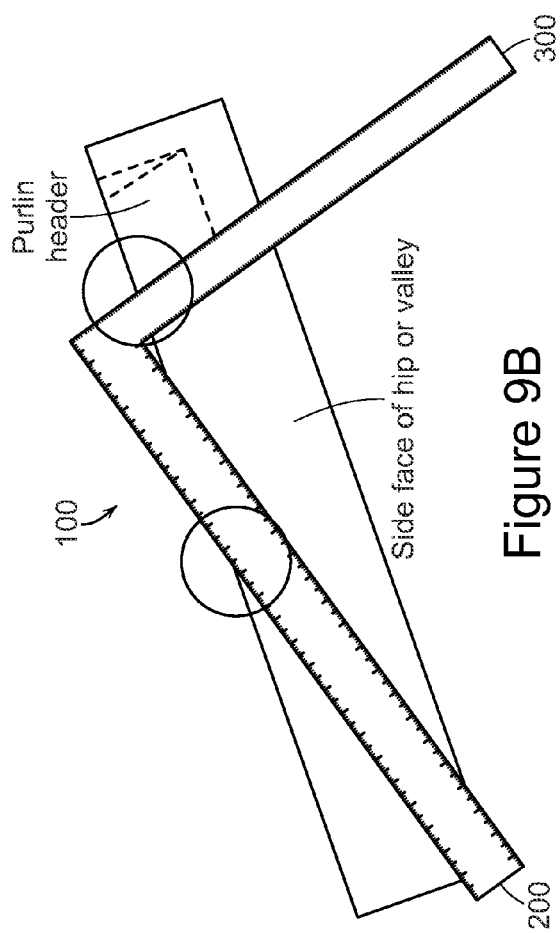
Figure 9A
Figure 9B

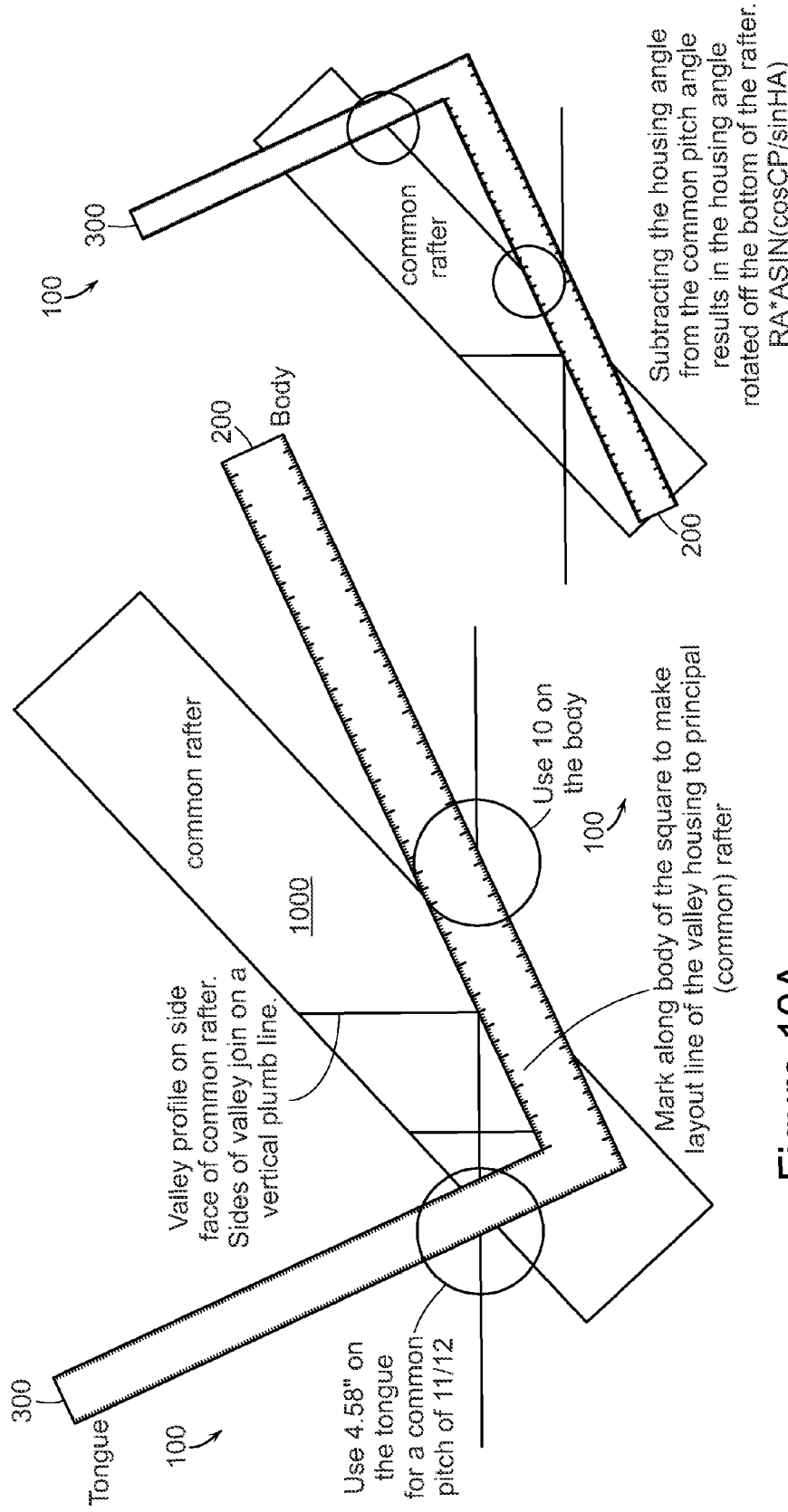

| Rise to Run Ratio Actual Degree | Common Metric Degree Equivalent | Rise to Run Ratio Actual Degree | Common Metric Degree Equivalent | Rise to Run Ratio Actual Degree | Common Metric Degree Equivalent |
|---|---|---|---|---|---|
| 2/12 = 9.46° | 10° | 8/12 = 33.69° | 32.5° | 14/12 = 49.4° | 50° |
| 3/12 = 14.03° | 15° | 9/12 = 36.96° | 35° | 15/12 = 51.34° | 51.5° |
| 4/12 = 18.43° | 20° | 10/12 = 39.80° | 40° | 16/12 = 53.13° | 52.5° |
| 5/12 = 22.61° | 22.5° | 11/12 = 42.51° | 42.5° | 17/12 = 54.78° | 55° |
| 6/12 = 26.56° | 25° | 12/12 = 45° | 45° | 18/12 = 56.3° | 57.5° |
| 7/12 = 30.25° | 30° | 13/12 = 47.29° | 47.5° | | |

Figure 12

UNIVERSAL FRAMING SQUARE

BACKGROUND

1. Field of the Invention

The present invention relates generally to framing tools and more specifically to a universally applicable framing square comprising calculated indicia and alignment marks for use with constructing equal and unequal pitched intersecting framing structures under any measurement system.

2. Discussion of Background Information

Developed over 100 years ago, the standard framing square rafter table provides a builder with calculated values for determining only 4 basic pieces of information: 1) length of common rafter, 2) length of hip and valley rafters, 3) the side cuts for the hip or valley and jack rafters, and 4) the difference in length for jack rafters for two distances between rafters: 16 inches and 24 inches.

Standard rafter squares typically comprise two flat, elongated arms—the body and the tongue—oriented at 90 degrees to one another and bearing incremented scales in inches. These scales enable carpenters to compute rafter lengths and rafter cut angles. The body scale indicia typically represent the run of the rafter wherein one (1) foot (i.e. 12 inches) represents the standard base run. The corresponding rise is specified on the opposing tongue as inches of rise per foot of run. A carpenter readily may identify locations for accurate level seat cuts and vertical plumb cuts by laying the square on the side of a beam, aligning the 12 inch mark on the body scale with the edge of the top face of the beam, and aligning with the edge of the beam the tongue scale number representing the ratio of the rise to the span (inches of rise per foot of run). Once the body and tongue are aligned, the carpenter may mark lines along the edges of the body and tongue respectively to indicate cut lines for seat and plumb cuts.

Some framing squares comprise various tables imprinted on the blades for use in calculating other construction measurements. Typically, these articles provide rudimentary tables for use with determine rafter lengths, board feet and diagonal brace lengths. For example, U.S. Pat. No. 247,353 to Howard teaches a square incorporating a useful rafter table for computing common rafter lengths. This table, printed on the front face of the square, provides rafter lengths for the standard roof pitches of one-fourth, one-third and one-half, based on a particular building span. Not only is this table limited to three common pitches, the square provides no information for determining measurements related to hip and valley formation. By comparison, U.S. Pat. No. 679,455 to Nicholls teaches a square incorporating a more robust rafter table containing computations for determining common rafter lengths for rise over run ratios of 2/12 to 18/12 and perhaps more ingeniously, this square provides tables for determining hip and valley rafter lengths.

These squares and others provide limited information, and all require additional complex calculations to determine angles and lengths at which to cut framing members, especially those forming compound joinery. In particular, these standard squares provide limited tabular information, and the measurement and alignment scales marked on the faces of these tools fail to address a large range of unequal pitches required during the design and building of unequal pitched roofs, for example. Some squares comprise complicated hinge mechanisms in an effort to improve usability; these tools, however, are less reliably "square" and nonetheless still limited to the scant markings on the face of the body and tongue. None of these existing squares has provided a wide breadth of precise calculations and alignment indicia requiring little computational effort on the part of the user to measure and cut lengths and angles during the formation of compound joinery.

Furthermore, in addition to the limited information provided to a builder, all existing squares are limited for use with either a standard measurement system (e.g. inches) or a metric system. None are universally applicable to both standard and metric units of measurement. Those squares that address metric systems are complex and cumbersome and require substantial additional calculations, which can result in computational errors and irreversibly incorrect cuts in framing members.

A need therefore exists for a framing square comprising tables and measurement indicia applicable to both imperial and metric units to be applied with equal accuracy, and wherein the tables eliminate any need for conversions. These tables include complete angular and dimensional information for common pitch and equal pitched hip and valley systems and also unequal pitched hip and valley systems.

SUMMARY OF THE INVENTION

The present invention solves the problems associated with existing builders squares.

The present invention is directed to a universal framing square for use in constructing compound framing systems of equal and/or unequal pitch. As with typical framing squares, the universal square comprises two flat arms, a body and a tongue. The planar body member comprises first body indicia on at least a first face thereof, wherein the first body indicia comprise the following elements: a first body scale incremented in tenths of a unit of measurement, an equal pitch rafter table comprising decimal calculations and/or angle calculations provided in columnar format in alignment with each unit of measurement, and a number associated with each unit of measurement and indicative of the equal pitch rise to which each column of the equal pitch rafter table applies.

The planar tongue member is integrally formed with the planar body member and oriented within the same plane at a 90 degree angle from the planar body member. The planar tongue member comprises first tongue indicia on at least a first face thereof and the first tongue indicia comprise the following elements: a first tongue scale incremented in tenths of a unit of measurement identical to the first body scale unit of measurement, a first unequal pitch rafter table of decimal calculations and/or angles provided in columnar format in alignment with each unit of measurement representing the rise, or numerator, of an unequal pitch ratio, wherein the decimal calculations and/or angles apply to the specific pairing of each unequal pitch ratio with a fixed front face primary pitch ratio, and a number associated with each unit of measurement and indicative of the secondary pitch rise to which each column of the first unequal pitch rafter table applies.

Selected indicia on the first body scale and a selected indicia on the first tongue scale simultaneously align with an edge of a framing member forming framework of equal and/or unequal pitch such that marking along the blade of the body and/or blade of the tongue the position for cutting the faming member in accordance with a value determined by the unequal pitch rafter table and/or equal pitch rafter table requires no additional trigonometric calculations.

In one embodiment, the unit of measurement is inches and the pitch run is 12 inches in every pitch ratio.

In another embodiment, the universal framing square further comprises second body indicia on the second face of the planar body member, wherein the second body indicia comprise the following elements: a second body scale incremented in tenths of a unit of measurement, a number associated with each unit of measurement and indicative of the roof pitch rise to which each column of the equal pitch rafter table applies; and a polygon table comprising decimal calculations and angles provided in columnar format in alignment with each unit of measurement for a specifically marked number of polygon sides.

In another embodiment, the universal framing square further comprises second tongue indicia on a second surface of the planar tongue member, wherein the second tongue indicia comprise the following elements: a second tongue scale incremented in tenths of a unit of measurement identical to the second body scale unit of measurement, a second unequal pitch rafter table of decimal calculations and/or angles provided in columnar format in alignment with each unit of measurement representing the rise, or numerator, of an unequal pitch ratio, wherein the decimal calculations and/or angles apply to the specific pairing of each unequal pitch ratio with a fixed back face primary pitch ratio, a marking of the a back face primary pitch ratio to which the second unequal pitch rafter table applies, wherein the back face primary ridge pitch ratio differs from the front face primary ridge pitch ratio.

In yet another embodiment, the universal framing square further comprises second body indicia on second face of the planar body member, wherein the second body indicia comprise the following elements: a second body scale incremented in tenths of a unit of measurement, a number associated with each unit of measurement and indicative of the pitch rise to which each column of the equal pitch rafter table applies, and a polygon table comprising decimal calculations and angles provided in columnar format in alignment with each unit of measurement for a specifically marked number of polygon sides.

In all embodiments the decimal and/or angular calculations provided in the equal pitch rafter tables and unequal pitch rafter table apply to calculations under any system of measurement, including standard units, imperial units and metric units.

BRIEF DESCRIPTION OF THE DRAWINGS

One will better understand these and other features, aspects, and advantages of the present invention following a review of the description, appended claims, and accompanying drawings in which:

FIG. 1 depicts a plan view of two faces of one embodiment of the square of the present invention.

FIG. 2A depicts the free end of the front face of the body of one embodiment of the square of the present invention.

FIG. 2B depicts the elbow end of the front face of the body of one embodiment of the square of the present invention.

FIG. 9A depicts the application of one embodiment of the square of the present invention to a framing member for laying out a purlin housing angle on the side of a hip or valley rafter.

FIG. 9B depicts the application of one embodiment of the square of the present invention to a framing member for laying out a side face for a hip or valley rafter joining to a purlin header.

FIG. 10A depicts the application of one embodiment of the square of the present invention to a framing member for laying out the housing angle on the bottom of a hip or valley rafter joining to a common rafter.

FIG. 10B depicts the application of one embodiment of the square of the present invention to a framing member for laying out the housing angle rotated off the bottom of the common rafter of FIG. 10A.

FIG. 12 depicts a table of values for converting metric degrees to standard pitch ratios presented on one embodiment of the square of the present invention.

DETAILED DESCRIPTION

Figure 3A:
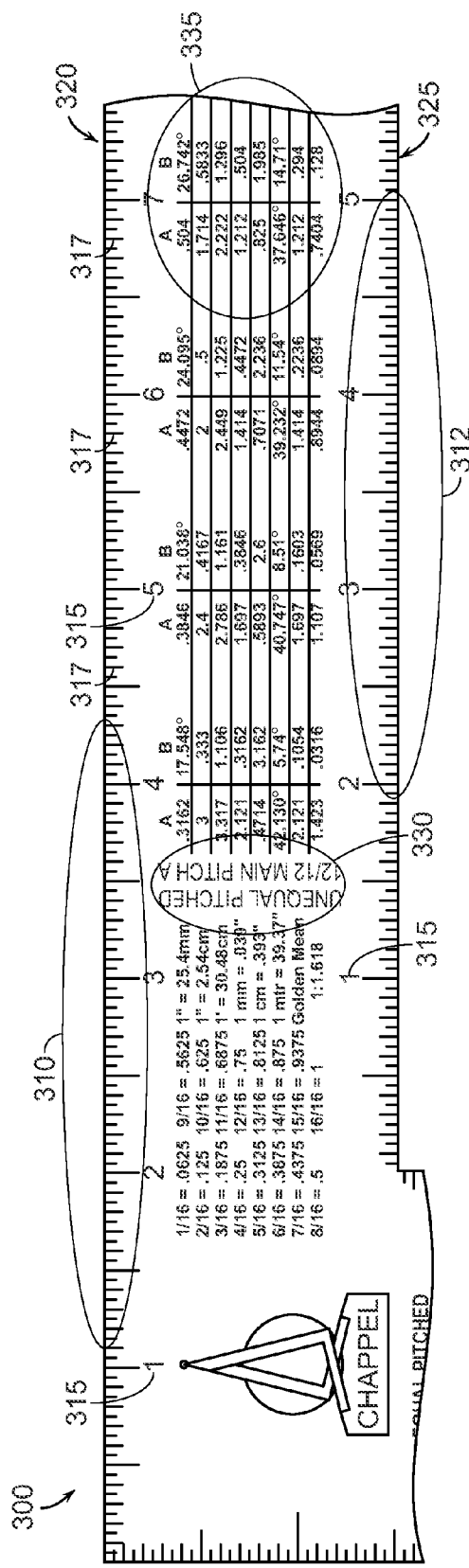
FIG. 3A depicts the elbow end of the front face of the tongue of one embodiment of the square of the present invention.

The Chappell Universal Square™ solves the problems associated with standard framing squares and provides a dynamic framing square bearing novel indicia and a novel arrangement of same for direct application to framing members during construction of complicated framing systems of equal and/or unequal pitched members. Typically, squares are limited to use with a single base unit of measurement, e.g. inches or millimeters, and provide limited tabulated information for use in calculating lengths, distances, and angles at which to cut framing members. The present invention is a tool that provides universal applicability for use in building both simple and complex structures according to metric and standard/imperial measurement systems. The present invention provides tabulated calculations aligned and indicia that enable construction of equal and complex unequal pitch framing members without necessitating the execution of complex trigonometric calculations.

Figures 2A, 2B:
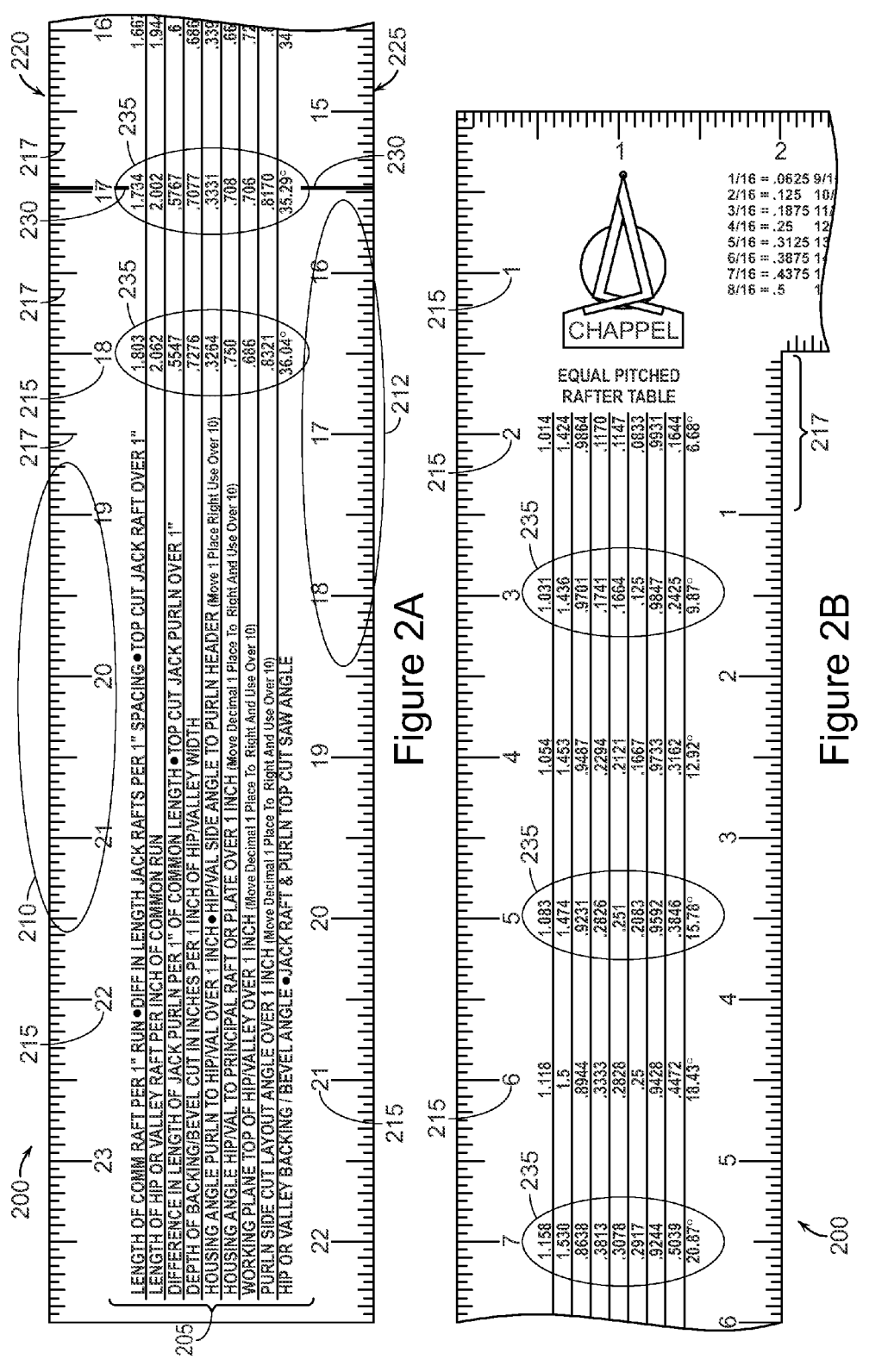

FIG. 1 depicts an overall plan view of the opposite faces of one embodiment of the universal square 100 of the present invention, the Chappell Universal Square™. The Universal Square™ 100 comprises two flat arms, a body 200 and a tongue 300, joined at a square, ninety degree angle. In the embodiment of FIGS. 1, 2A, 2B, 4A and 4B, the outer edge body scales 210, 410 extend to twenty-four measurement units 215 and, as depicted in FIGS. 1, 3A, 3B, 5A and 5B the out edge tongue scales 310, 510 extend to eighteen measurement units 315, 515. In the present embodiment, the measurement units 215, 315, 415, 515 are inches, and the indicia 217, 317, 417, 517 on the scales 210, 310, 410, 510 between successive measurement units 215, 315, 415, 515 mark those distances in tenths of an inch.

FIGS. 2A through 5B provide blown out views of the tables provided on both faces of the body 200 and tongue 300 of one embodiment of the present invention. As indicated in FIGS. 2A and 2B, in one embodiment, the front face of the body 200 of the Universal Square™ 100 comprises an expanded equal pitch rafter table 205. In this embodiment, the expanded rafter table provides fourteen critical tabulated calculations for using in applying the Universal Square™ during frame construction: 1) common rafter length per one inch of run, 2) difference in lengths of jack rafters per one inch of spacing, 3) top cut of jack rafters, 4) length of hip and valley rafters per inch of common run, 5) difference in length of jack purlins per inch of spacing, 6) top cut of jack purlins, 7) depth of backing/bevel angles per inch of hip or valley width, 8) housing angle of purlin to hip or valley, 9) hip and valley side layout angle to purlin header, 10) housing angle of hip or valley to principal (common rafter) and horizontal plate, 11) working plane top of hip or valley, 12) purlin side cut angle, 13) hip and valley backing angles, and 14) jack rafter and purlin top cut saw angle.

Figure 3B:
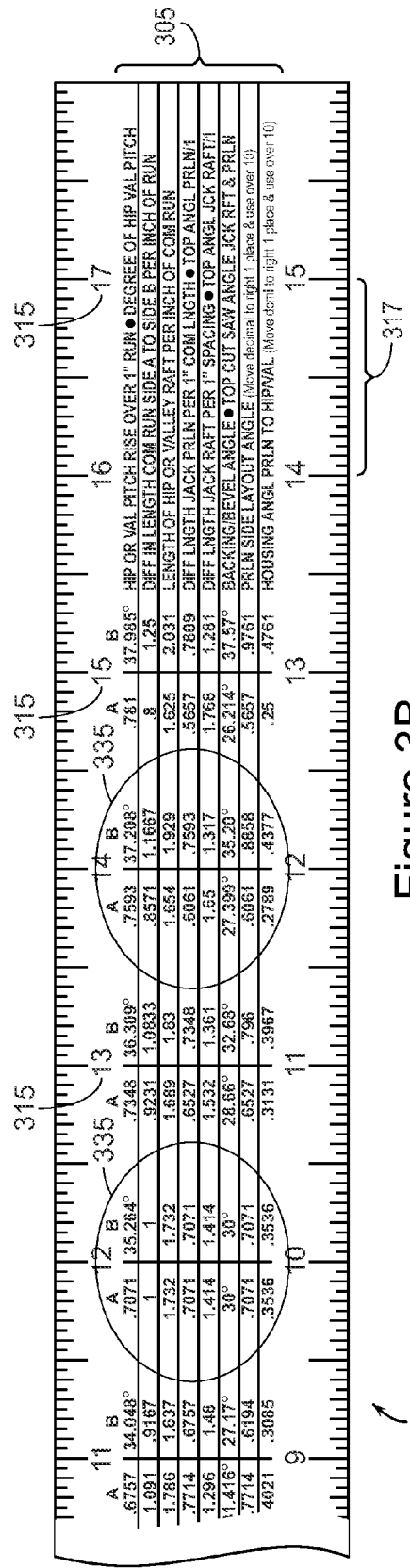
FIG. 3B depicts the free end of the front face of the tongue of one embodiment of the square of the present invention.

As indicated in FIGS. 3A and 3B, in one embodiment, the front face of the tongue 300 of the Universal Square™ 100 comprises a comprehensive unequal pitch rafter table 305. In one embodiment, the unequal pitch rafter table 305 comprises thirteen critical values for constructing fames having unequal pitches as indicated by the main pitch marking 330: 1) hip and valley pitch in inches of rise per one (1) inch of run, 2) hip and valley pitches in degrees, 3) difference in length of runs side A to side B, 4) length of hip or valley per inch of common run, 5) difference in length of jack purlins per inch of spacing, 6) top cut of purlin, 7) Difference in length of jack rafters per inch of spacing, 8) top cut angle of jack rafters, 9) backing and bevel angles in degrees, 10) top cut saw angles for jack rafters and purlins, 11) purlin side face layout angle, 12) housing angle of purlin to hip or valley, and 13) side layout angle of hip and valley to purlin header.

Figure 4A:
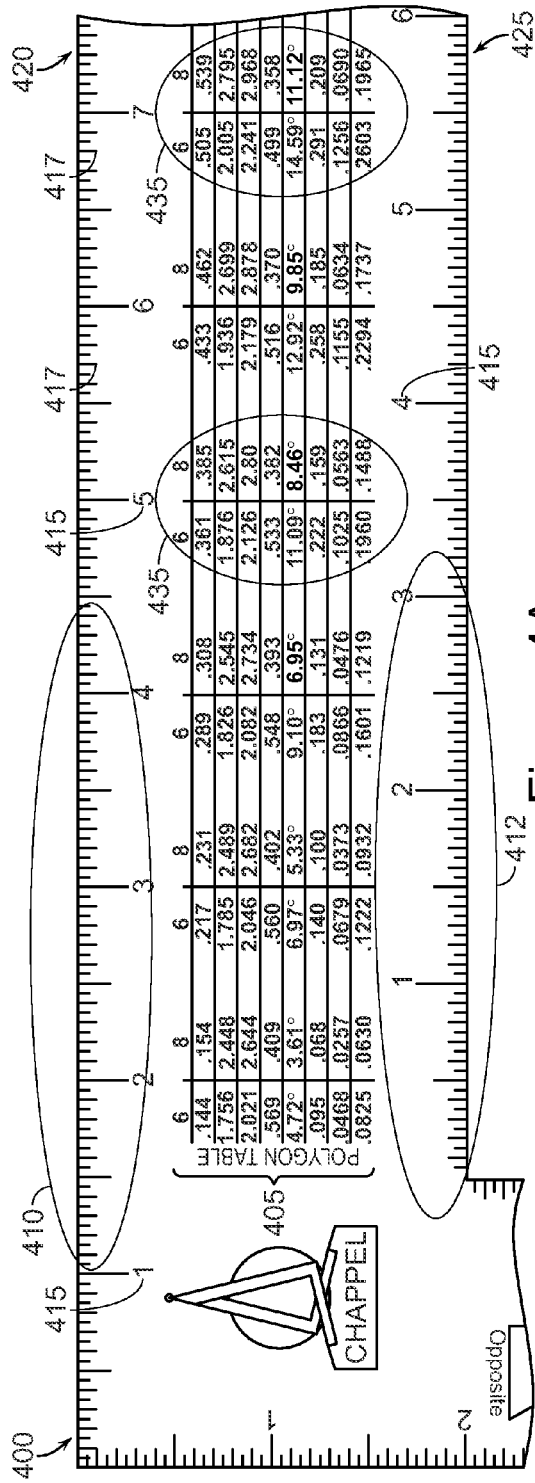
FIG. 4A depicts the elbow end of the back face of the body of one embodiment of the square of the present invention.
Figure 4B:
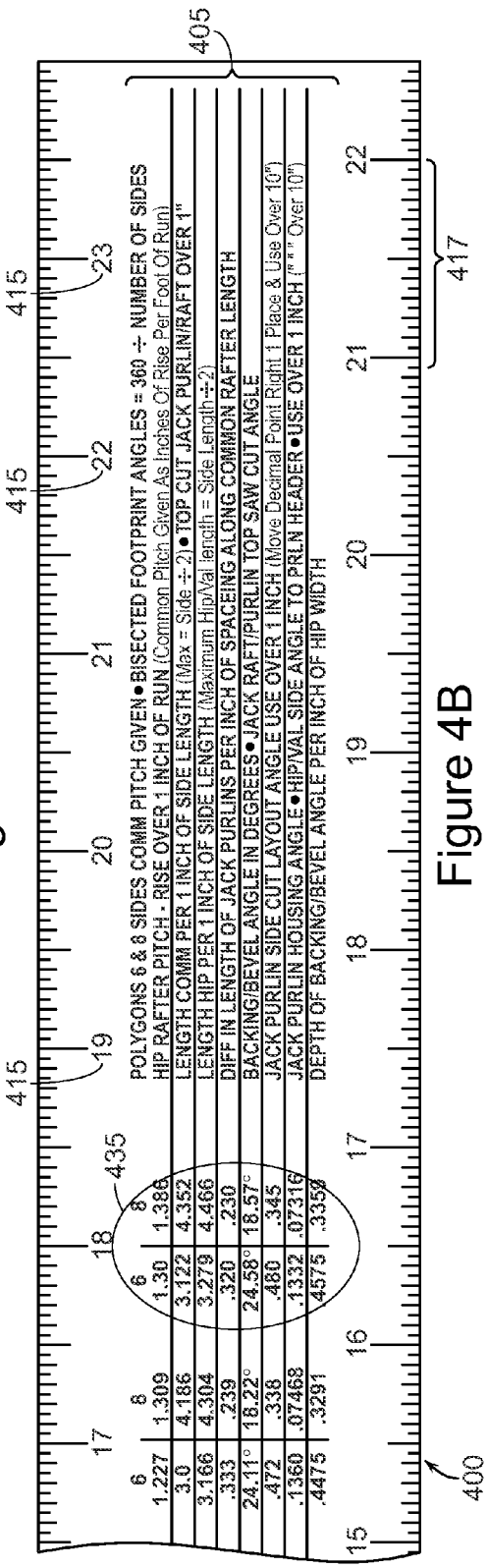
FIG. 4B depicts the free end of the back face of the body of one embodiment of the square of the present invention.

As indicated in FIGS. 4A and 4B, in one embodiment, the back face of the body 200 of the Universal Square™ 100 comprises a polygon rafter table 405. (In FIGS. 4A and 4B the back face of the body 200 is indicated by the lead- and number four hundred (400) for clarity in distinguishing surface markings and indicia on the back face from surface markings and indicia on the front face of the body 200.) In the embodiment of FIG. 4, the Universal Square™ 100 comprises a polygon rafter table 405 of values for 6 and 8 sided polygons with common pitch ratios from 2/12 to 18/12. In the embodiment of FIG. 4, the polygon rafter table 405 depicts the following tabulated calculations: 1) hip/valley rafter pitch in rise over one (1) inch of run, 2) length of common rafters per one (1) inch of side length, 3) difference in length of jack rafters per inch of spacing, 4) length of hip/valley per one (1) inch of side length, 5) difference in length of jack purlins per one (1) inch of spacing, 6) backing and bevel angles in degrees, 7) jack rafter and purlin top cut saw angle, 8) jack purlin side cut angle, 9) jack purlin housing angle, 10) hip and valley side layout angle to purlin header, and 11) depth of bevel and backing angles per inch of hip width.

Figures 5A, 5B:
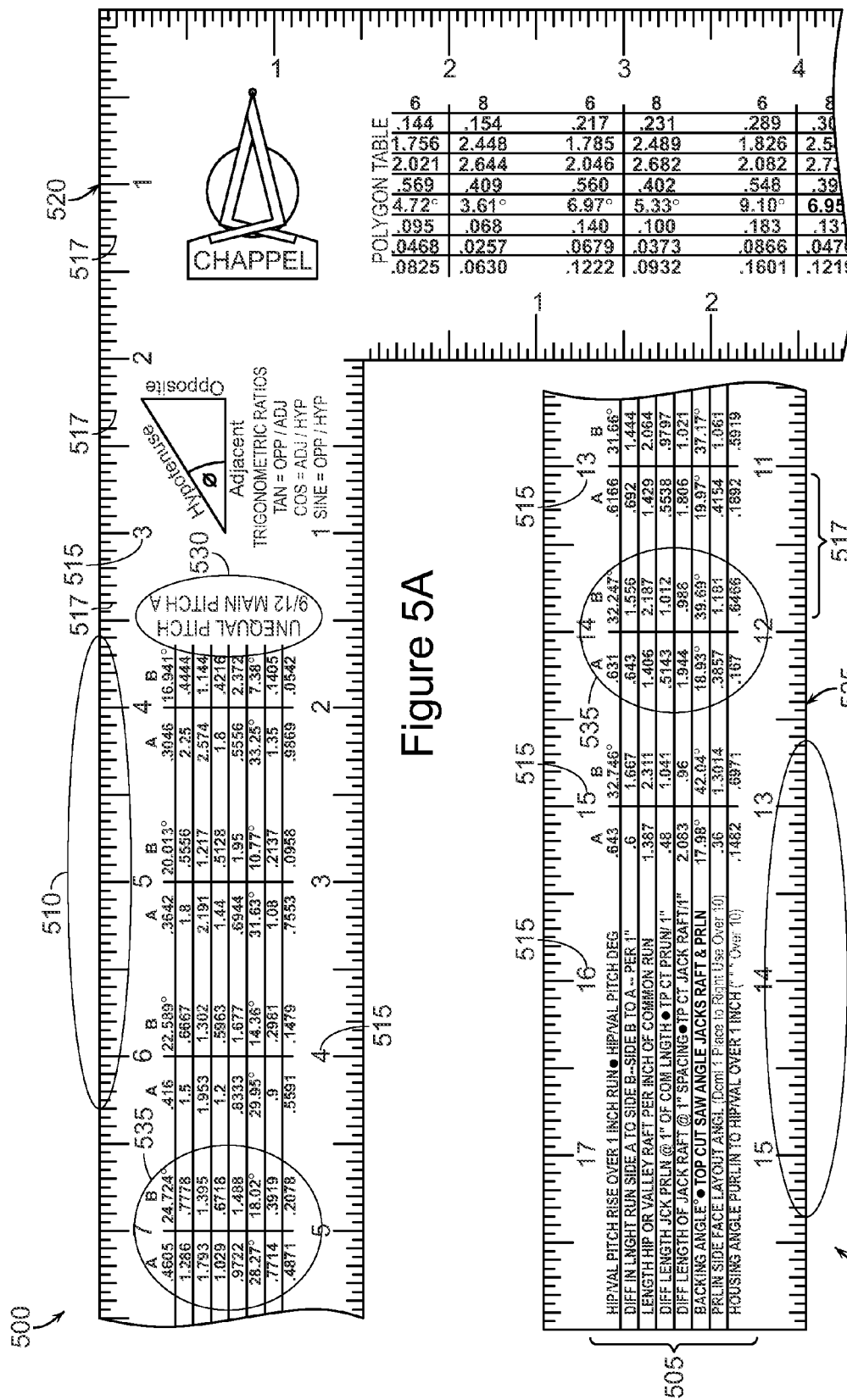
FIG. 5A depicts the elbow end of the back face of the tongue of one embodiment of the square of the present invention.
FIG. 5B depicts the free end of the back face of the tongue of one embodiment of the square of the present invention.

As indicated in FIGS. 5A and B, in one embodiment, the back face of the tongue 300 of the Universal Square™ 100 comprises a comprehensive unequal pitch rafter table 505. (In FIGS. 5A and 5B the back face of the tongue 300 is indicated by the lead-line and number five hundred (500) for clarity in distinguishing surface markings and indicia on the back face from surface markings and indicia on the front face of the tongue 300.) In one embodiment, the unequal pitch rafter table 505 comprises thirteen critical values for constructing fames having unequal pitches as indicated by the unequal pitch ratio value 530 that differs from that on the front face of the tongue: 1) hip and valley pitch in inches of rise per one (1) inch of run, 2) hip and valley pitches in degrees, 3) difference in length of runs side A to side B, 4) length of hip or valley per inch of common run, 5) difference in length of jack purlins per inch of spacing, 6) Top Cut of purlin, 7) difference in length of jack rafters per inch of spacing, 8) Top Cut angle of jack rafters, 9) backing and bevel angles in degrees, 10) top cut saw angles for jack rafters and purlins, 11) purlin side face layout angle, 12) housing angle of purlins to hip or valley, and 13) side layout angle of the hip and valley to purlin header.

Returning to the embodiment of FIGS. 2A and 2B, the front face of the body 200 is depicted in two disjoint pieces representing the two ends of the body 200. FIG. 2A depicts the free end of the body 200 and FIG. 2B depicts the attached end of the body 200 that intersects the attached end of the tongue 300 at the elbow of the square. The front face of the body 200 comprises an equal pitch rafter table 205 for use in measuring and constructing framing elements comprising an equal pitched structure, such as, for example, a roof of equal pitch. The front face of the body 200 further comprises an outer edge body scale 210 positioned along the outer edge 220 of the body 200 and incremented in tenths of a measurement unit 215. In the embodiment of FIGS. 1 though 5B, the unit of measurement is inches and the indicia 217 between subsequent numerical markings 215 indicate tenths of an inch. The tabulated calculations 235, which extending beneath each measurement unit 215 in a columnar format and which correspond with headings in the equal pitched rater table 205, are calculated based on number of inches of rise per foot of run, wherein the number of inches of rise is indicated by the numerical marking 215 atop the column of calculations. Despite the inch-based scales 210, 212, the tabulated calculations 235 beneath each measurement unit 215, are interchangeably applicable to any measurement system, including metric, without requiring laborious conversions between measurement systems. This concept will be further elucidated by the usage examples herein provided.

The inner edge 225 of the body 200 further comprises an inner edge body scale 212 which enables aligning indicia on the inner edge body scale 212 with an edge of a framing member while simultaneous aligning indicia on an inner edge tongue scale 312 with the same edge of the framing member. In other words, if the inner edge body scale 212 on the inner edge 225 of the body is aligned with an edge of a framing member, then the tongue scale 312 on the inner edge 325 of the front face of the tongue 300 should also align with the same edge of the framing member. If the outer edge body scale 210 is aligned with the edge of a framing member, then the outer edge tongue scale 310 also should align with the same edge of the framing member. The inner and outer edge scale pairs of the Universal Square™ are applicable with equal accuracy.

As shown in FIGS. 3A, 3B, 5A and 5B, the front face and back face of the tongue 300 are marked similarly to the front face of the body 200. The front face of the tongue comprises an unequal pitch rafter table 305, an outer edge scale 310 placed along the outer edge 320, an inner edge scale 312 placed along an inner edge 325, and units of measurement 315 incremented in indicia 317 representing tenths of the unit of measurement 315. Additionally, the front face of the tongue 300 a main pitch marking 330 representing the main pitch ratio against which an unequal pitch applies according to the tabulated calculations 335 provided in columnar format beneath the units of measurement 315 on the tongue 300. The back face of the tongue 300 provides the same breadth of information as the front face, only the tabulated calculations 535 provided beneath each unit of measurement 515 apply to a main pitch marking 530 distinct from the front face main pitch marking 330.

As indicated in FIGS. 4A and 4B, the back face of the body 200 is marked similarly to the front face of the body 200, only two columns of tabulated calculations 435 extend beneath each unit of measurement 415. These two columns represent calculated rafter table values for polygonal structures. In the embodiment of FIGS. 4A and 4B, the polygon rafter table 405 provides tabulated calculations 435 for 6 and 8 sided polygons.

The following descriptions provide detailed instructions for applying the equal pitch rafter table 205 during construction of equal pitched framing members. What are provided here are enabling instructions for utilizing all of the tabulated calculations 235 during construction.

Returning to the embodiment of the Universal Square™ 100 depicted in FIG. 2A, the equal pitch rafter table 205 provides a fourteen critical values. The top most row, i.e. the first row, in the equal pitch rafter table 205 provides tabulated calculations 215 for computing the length of a common rafter per one inch of run. The numbers listed on this row below any of the units of measurement 215, from 2 to 24, provide the ratio of the length of a common rafter per inch of common run for a roof pitch ration corresponding to the unit of measurement 215 over a base unit of run, here 12 inches. As an example, under the unit of measurement 215 represented by 18, the decimal value listed corresponding to this row in the rafter table 205 is 1.803. The unit of measurement 215 represented by 18 corresponds to a roof pitch ratio of 18/12 (18 inches of rise for every 12 inches of run). The value in this row, in effect, is the ratio of the rafter run to the rafter length. In the example of an 18/12 pitch, this ratio is a constant of 1:1.803. This ratio remains true for any conceivable span or rafter run, so long as the common rafter pitch is 18/12. This ratio changes depending on the given inches of rise per foot of run. Multiplying a specified rafter run by 1.803 results in the length of the common rafter for an 18/12 pitch.

The unit of may be designated on a building plan in inches, feet, centimeters, meters or miles, for example, and applying the tabulated calculation 215 will produce an accurate result independent of the specific measurement unit. For example, using a measurement unit of feet will produce a value in feet. Using a measurement unit of meters will produce a result in meters. For example, for a rafter run of 9 feet and a pitch of 18/12, the calculation to feet would be 9 times the tabulated calculation for an 18/12 pitch, or 1.803, resulting in a measurement of 16.227 feet. Using meters instead of feet simply would result in 16.227 meters.

As another example of how to apply the first row of tabulated calculations 235, the Universal Square™ 100 provides a mechanism for calculating differences in length for jack rafters per one (1) inch of spacing. This is a unique feature because the Universal Square™ 100 provides far more comprehensive calculated jack rafter calculations than the standard two spacing value, 16 inch and 24 inch. Using the base factor of one (1) (one (1) inch, foot, one (1) centimeter, one (1) meter, etc.), the Universal Square™ enables a user to understand the overall relationship of jacks to hips to common rafters, as well as the relationships of intersecting planes. The unitary base unit simplifies calculations of the difference in length of the jack rafters for any given spacing, at any roof pitch from 2 to 18, in any system of measurement (e.g. standard, metric).

In any equal pitch hip and valley roof system with a corner angle of 90 degrees, the bisected footprint angle (angle of hip/valley to side walls) is 45 degrees. Every inch of spacing along one sidewall therefore corresponds to an equal inch of spacing along the adjoining wall. Likewise, this spacing on one side corresponds directly to the run of the common rafter of the opposing side. The difference in jack length per inch of spacing on equal pitched roof systems, therefore, is equal to the length of the common rafter per inch of run.

For example, take a common pitch of 10/12 and a rafter spacing of 30, measured on center. Measuring from the corner of the building (zero point) places the first jack rafter at 30 inches from zero and the second at 60 inches from zero. The value in the column of tabulated calculations 235 under the unit of measurement 215 represented by the number ten (10) is 1.302. Multiplying the distance to the center of the first jack, or 30 inches, by the tabulated calculation 235 represented by 1.302 for the specified pitch results in a measurement of 39.06. For the second jack rafter placed at 60 inches from the zero point, the measurement is then 78.12 inches, determined by 60 multiplied by the tabulated calculation 235 of 1.302. Again the tabulated calculations 235 are provided in decimal format and therefore are directly applicable to any unit of measurement.

Returning to FIG. 2A, the top row entry of the equal pitch rafter table 205 further provides an indication that tabulated calculations 235 apply to making a top cut in a jack rafter for one (1) inch of run. A jack rafter is a rafter in the common pitch that intersects the hip or valley rafter short of its full length. The jack rafter may extend from the plate to the hip/valley or from the hip/valley to the ridge. The angle of intersection accords with the angle of the common rafter to the hip/valley rafter. The top cut of the jack rafter (and jack purlin) therefore corresponds with the included roof angles (angles in the roof plane) that are determined by the right triangle created by the common rafter, hip/valley rafter and the top plate. The tabulated calculations 235 given in the first row of the equal pitch rafter table 205 on the front face of the body 200 of the Universal Square™ specify the angular ratio of this angle to one.

Figure 6:
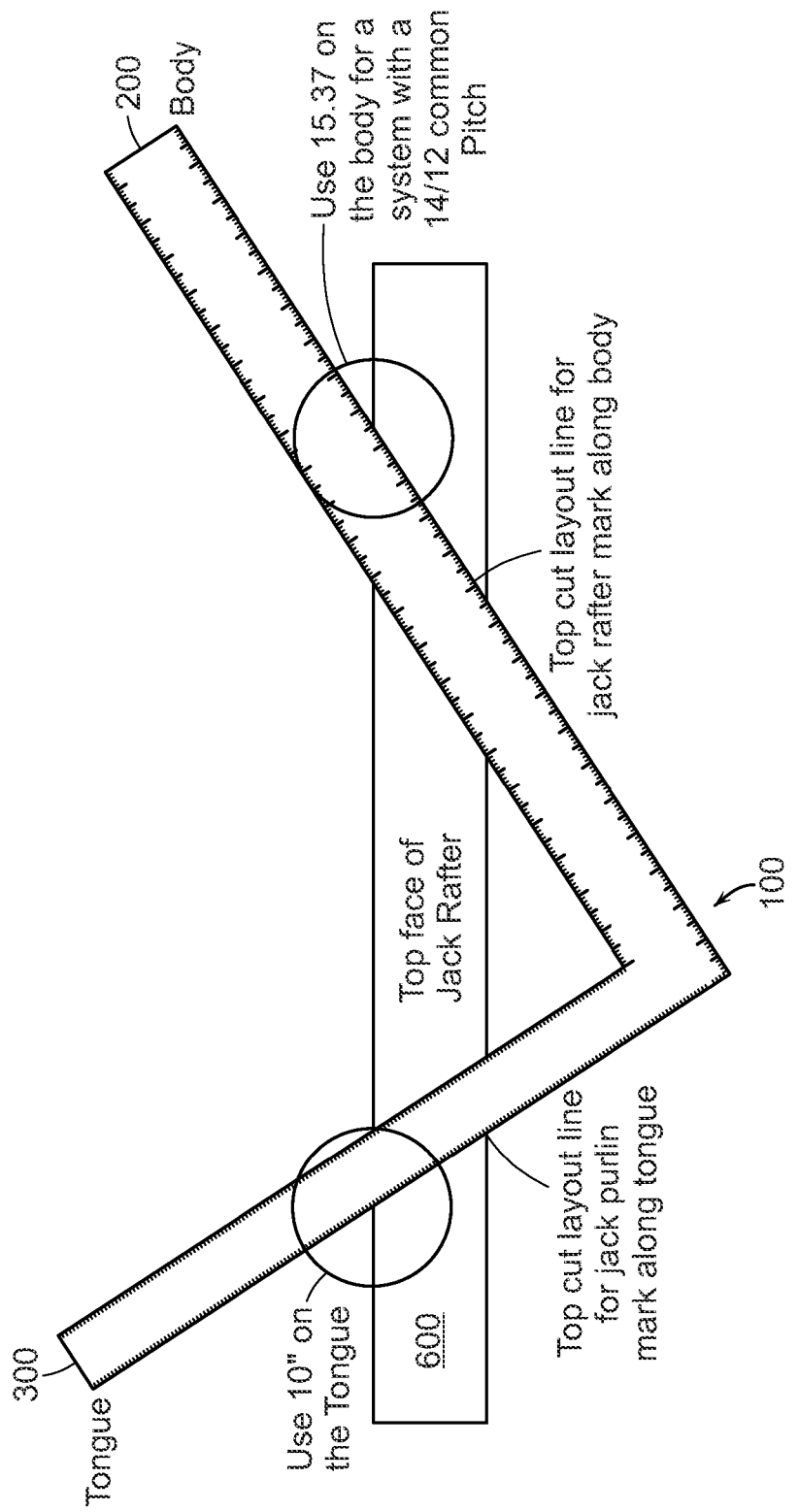
FIG. 6 depicts the application of one embodiment of the square of the present invention to a framing member for laying out a top cut for a jack rafter.

For example, the first calculated value in the column of tabulated calculations 235 under the unit of measurement 215 represented by the number fourteen (14) is 1.537. The angle therefore corresponds with the ratio of 1:1.537. FIG. 6 depicts application of the Universal Square™ 100 to a framing member 600 for marking a layout for this cut. Marking the layout angle of the jack rafter (and also its complimentary angle for jack purlins), using the Universal Square™ simply requires mentally carrying the decimal point of the corresponding tabulated calculation 235 one place to the right to identify the appropriate indicia 217 on the body to align with the edge of the framing member 600. Then, a user may align that indicia 217 with the unit of measurement 315 indicted by the number ten (10) on the front face of the tongue 300 of the Universal Square™.

So, continuing with this example of a pitch of 14/12, the tabulated calculation 235 is 1.537. Moving the decimal one place to the right produces a value of 15.37. As depicted in FIG. 6, the outer edge body scale 210 is aligned with the edge of the framing member 600 at the indicia 217 represented by 15.37 while the outer edge tongue scale 310 is simultaneously aligned with the edge of the framing member at the unit of measurement 315 indicated by the number ten (10). Marking the framing member 600 along the outer edge 220 of the body 200 creates a top cut layout line for the jack rafter and marking the framing 600 member along the outer edge 320 of the tongue 300 produces a top cut layout line for the jack purlin.

Returning to FIG. 2A, the second row of the equal pitch rafter table 205 provides tabulated calculations 235 for the length of a hip or valley rafter per inch of common run. Using this ratio readily provides the length of any hip or valley rafter for a known common roof pitch. For example, the tabulated calculation 235 beneath the unit of measurement 215 represented by the number fifteen (15) is 1.887. This tabulated calculation 235 specifies that for each inch of common run, the hip or valley length will be 1.887 inches. Determining the full-length of a hip or valley rafter for a 15/12 pitch simply requires multiplying the total run by this given tabulated calculation 235. For a run of 15 feet and a pitch of 15/12, the total run is 180 inches, and the hip/valley length is then 180 multiplied by 1.887, or 339.66 inches. The Universal Square™ therefore provides calculated values that eliminate a need for porting a calculator for executing complex trigonometric calculations during construction. Simple math using the tabulated calculations 235 quickly and accurately produces the desired measurement value.

Figure 7:
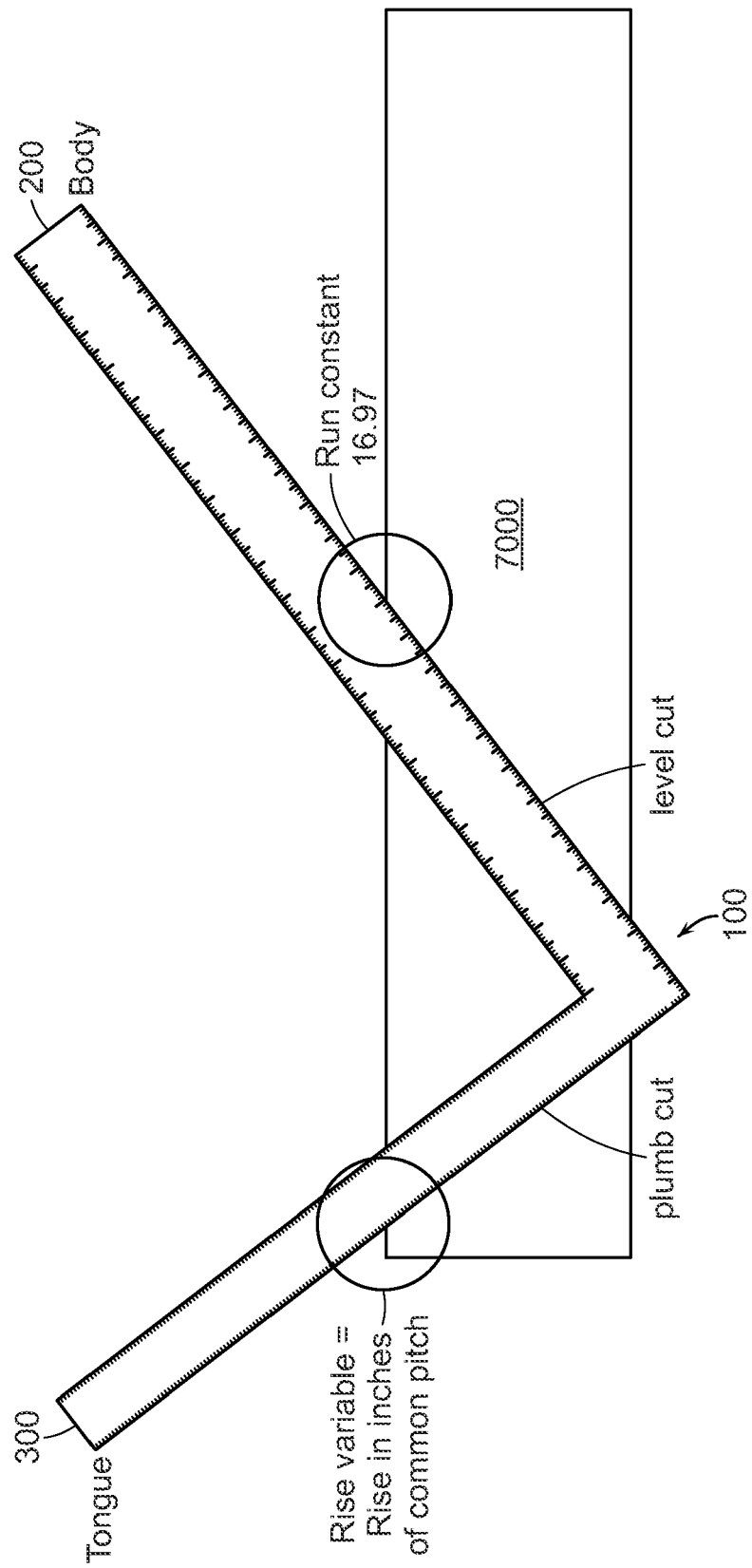
FIG. 7 depicts the application of one embodiment of the square of the present invention to a framing member for laying out hip and valley rafters for an equal pitch roof system.

Furthermore, as shown in FIGS. 2A and 7, a run constant 230 is marked along the outer edge body scale 210 between indicia 217 at 16.9 and 17.0 such that the run constant 230 represents a measure of 16.97. This run constant 230 enables a builder to lay out cuts for hip and valley rafters. By aligning the run constant 230 with the edge of a framing member 700 and aligning the pitch rise value on the tongue 300 with the edge of the framing member 700, a user may mark a horizontal level cut line along the out edge 220 of the body 200 and a vertical plumb cut line along the outer edge 320 of the tongue 300. The example of FIG. 7 represents laying out the hip and valley rafters for a common pitch of 10/12.

Returning to the embodiment of the Universal Square™ 100 depicted in FIG. 2A, the tabulated calculations 235 specified in row number three (3) of the equal pitch rafter table 205 directly relate included roof angles in the roof plane. The tabulated calculations 235 here provide a ratio representing the difference in length of the purlin per inch of common rafter length. Purlins are framing members that run parallel to the plate and ridge and perpendicular to common rafters. Jack purlins are framing members that intersect a hip or a valley. Because purlins run perpendicularly to the common rafters, the spacing between purlins measures from eaves to ridge along the common rafter length. The tabulated calculation 235 provided under a corresponding roof pitch is based on the difference (reduction or increase) per inch of common rafter length.

Take the example of a 14/12 pitch. The tabulated calculation 235 corresponding with the unit of measurement 215 indicated by 14 is 0.6508. For every inch of travel along the common rafter length, the jack purlin length changes 0.6508 inches. Applying this factor to a purlin spacing of 48 inches, for example, produces a length change of 31.238 inches. In other words, the difference in length of each jack purlin spaced at 48 inches will be 31.238 inches. The Universal Square™ once again provides a pre-calculated multiplication factor for easily, efficiently and accurately determining a measurement value without requiring any trigonometric derivations and calculations.

Figure 8:
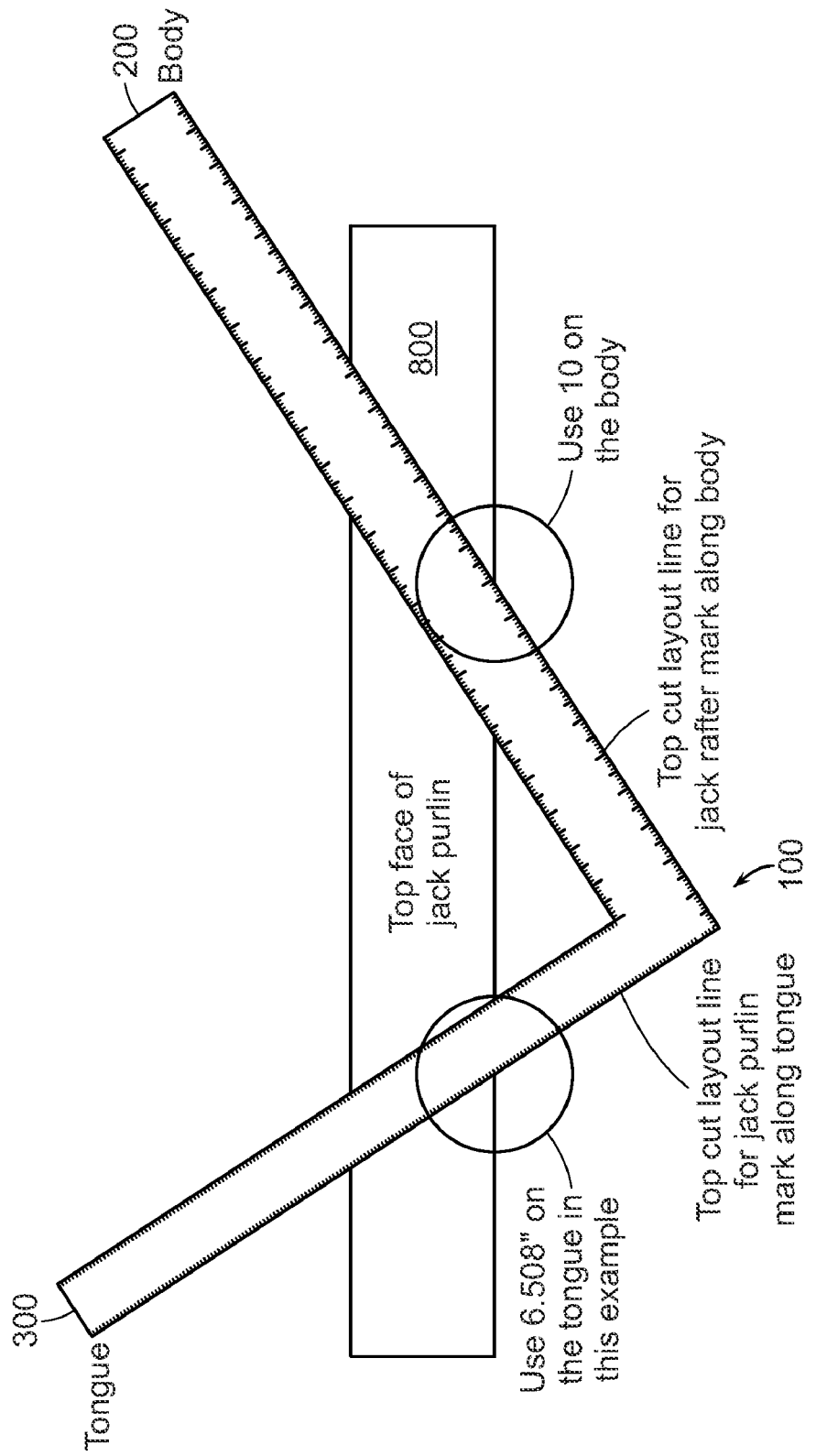
FIG. 8 depicts the application of one embodiment of the square of the present invention to a framing member for laying out a top cut for a jack purlin.

In addition to determining the jack purlin lengths, this tabulated calculation 235 enables determination of the angle for the top cut layout of the purlin. This angle is often referred to as the sheathing angle in conventional construction because of cutting the angle of the sheathing into a hip or valley. In this case, the value provides an angular ratio applied to a purlin framing member 800 by aligning the Universal Square™ as indicated in FIG. 8. Using this tabulated calculation 235 to lay out the top cut of the purlin simply requires mentally moving the decimal point to the right one place. For example, for a 14/12 pitch, moving the decimal of the tabulated calculation 235 one place to the right produces 6.508. A user may then mark the jack purlin top cut angle on the framing member 800 by aligning the location along the scale 310 representing 6.508 (locatable by the tenths marking indicia 317 on the front face of the tongue 300) with the edge of the framing member 800 and simultaneously aligning the unit of measurement 215 represented by the number ten (10) on the front face of the body 200. Marking along the outer edge 320 of the tongue 300 produces a cut line for the jack purlin. Marking along the outer edge 220 of the body 200 produces a cut line for the jack rafter.

Returning again to FIG. 2, the fourth row of the equal pitch rafter table 205 provides tabulated calculations 235 for the depth of a backing or bevel cut per one inch of hip or valley width. The backing/bevel angle is the angle at which the two opposing roof planes intersect and meet at the apex of the hip, or trough of a valley rafter, at a line along a vertical plane that passes through the longitudinal center of the hip or valley rafter. The depth of the backing/bevel angle, as measured perpendicularly to the top face of the hip or valley, is a rotation of the angle in plane. This tabulated calculation 235 in the fifth row enables easy measurement and marking of the depth of a cut on the side face of the actual hip or valley rafter. The backing/bevel angle has many other implications in a compound roof system, especially with regard to mortises and tenons projected from or into framing surfaces formed in timber framing.

The tabulated calculations 235 provided in the fourth row of the equal pitch rafter table 205 cover all rotations for any common pitch from 2/12 to 18/12 and provide the depth of the angle as measured perpendicularly to the top face of the hip or valley. The value given for the depth of the backing or bevel angle is based on the ratio of depth to one (1) unit (e.g. one (1) inch) of beam width. Because the angles on a hip or valley rafter always generate from the center of the timber and slope toward the side faces, determining the side face depth requires that a user apply this tabulated calculation 235 over half the width of the beam.

Proper calculations require using the half-width of the beam as the base factor. If, for example, the common pitch were 9/12, the fourth row tabulated calculation 235 corresponding with the unit of measurement 215 represented by the number nine (9) is listed as 0.4685. For an 8 inch wide beam the calculation would be half the width, or four inches, multiplied by 0.4685. The backing/bevel depth in this example therefore would be 1.874 inches. Again, the tabulated calculations 235 in the fourth row provide absolute ratios applicable to any measurement system, such as standard or metric.

Returning again to the embodiment of the Universal Square™ depicted in FIGS. 2A and 2B, the fifth row of the equal pitch rafter table 205 provides tabulated calculations 235 for the housing angle of the purlin to hip or valley over one (1) inch for roof pitches from 2/12 to 18/12. When a purlin (a beam parallel to the plate) joins to a hip or valley, a slight rotation occurs because of the rotation of the bevel or backing angle. This angle rotates the side face of the purlin incrementally from 90 degrees perpendicular to the top of the hip or valley rafter along its side face. The tabulated calculation 235 provided in the fifth row of the equal pitch rafter table 205 represents the ratio of the purlin housing angle to 1, on the side face of a framing member and measured from a line drawn perpendicular to the top face of the hip or valley. As with all other values used on the Universal Square™ 100 relating to angular dimension, this is the ratio of the value pertaining to one (1) unit of measurement.

FIG. 9A depicts an example of applying the Universal Square™ 100 to a framing member 900 to mark same for cutting this angle. This example addresses a construction of 6/12 pitch. The tabulated calculation 235 corresponding to the fifth row under the unit of measurement 215 indicated by the number six (6) reveals that the housing angle ratio is 0.2828:1. Because this is an angular ratio, a builder can lay out the angle along the side face of the hip or valley by using the same method as used previously, i.e. by mentally moving the decimal one place to the right and aligning the edge of the framing member 900 with the location along the tongue scale 310 representing 2.828 (locatable by the tenths marking indicia 317 on the front face of the tongue 300) and the unit of measurement 215 represented by the number ten (10) on the opposing body 200 of the square. This alignment of the Universal Square™ 100 enables a user to mark the framing member 900 along the outside edge 320 of the tongue 300. This marking indicates the accurate angle of the purlin housing angle. Additionally, as indicated in FIG. 9B, this angle is also the side layout angle of the side face of a hip or valley rafter joining to a purlin rotated to the common roof plane and square to the top of the common rafter.

Returning again to FIG. 2, the sixth row of the equal pitch rafter table 205 provides tabulated calculations 235 for the housing angle of the hip or valley to the principal, or common, rafter or plate over one (1) inch. When a hip or valley rafter joins to the side face of a principal (common) rafter or a level horizontal plate, the sides of the hip or valley join to the common along a vertical plumb line. The bottom face of the hip or valley however, joins to the common at a rotated angle relative to a horizontal level line. In many conventional situations this angle is often ignored and simply will be cut flush, nailed and covered. In timber framing, or when working with beams which will be exposed in a cathedral roof system, knowing this angle is necessary for making a fully recessed housing or extending tenons on the valley and mortises on the principal rafter or horizontal plate. The value on this row of the equal pitch rafter table 205 provides the tabulated calculation 235 that enables accurate and speedy determination this angle.

Just as in the previous example, this is an angular rotation. Utilizing the Universal Square™ 100 to layout this angular cut requires first mentally moving the decimal point one place to the right to determine the alignment location on the tongue scale 310. Utilization then requires aligning the Universal Square™ 100 with the edge of a framing member according to the alignment location on the tongue scale 310 and the unit of measurement 215 represented by the number ten (10) on the body 200 of the Universal Square™ 100. FIG. 10 depicts the foregoing example. For a roofing system having a common pitch of 11/12, the tabulated calculation 235 listed under the unit of measurement 215 represented by the number eleven (11) is 0.458. The angle therefore, has a ratio of 0.458:1. Moving the decimal point one place to the right produces 4.58, the location for which is determinable by the tenths indicia 317. A user will align that location, 4.58, along the tongue scale 310 with the edge of the framing member (here the common rafter 1000) and will simultaneously align the unit of measurement 215 represented by the number ten (10) on the front face of the body 200.

Marking the common rafter 1000 for this cut first requires drawing a level line across the face of the hip or valley rafter in the location of the joint. The next step requires placing the Universal Square™ 100 on this level line such that the level line aligns with the location at 4.58 on the tongue scale 310 (accurately locatable between the tenths indicia 317) and the unit of measurement 215 represented by the number ten (10) on the body. A user may then mark a line along the inside edge 225 of the body 200 of the square and therefore mark the accurate angle of the hip or valley rafter housing for the bottom of the rafter. The side faces join along a vertical plumb line.

The tabulated calculation 235 for this value is the tangent of the housing angle. Calculating the inverse of the tangent produces the angle value in degrees. In this example for an 11/12 pitch, the housing angle is 24.6 degrees. Subtracting this angle from the common roof pitch angle produces the housing angle from the bottom face of the common rafter, which is 17.9 degrees in this example.

Returning again to FIG. 2, the seventh row of the equal pitch rafter table 205 provides tabulated calculations 235 for the working plane top of a hip or valley over one (1) inch. Prior to cutting the backing angle on a hip or valley, the top face of the hip or valley is considered the working plane of the rafter. In conventional construction, when using nominally dimensioned 2-by material for hips and valleys, actually cutting the backing or bevel angle on the beam is often unnecessary. All of the layout, however, must be transferred on and across this working surface prior to actually cutting the bevels and exposing the actual roof plane surfaces. For this reason, knowing this rotated working plane is extremely helpful with producing an accurate layout. The Universal Square™ 100 provides an easy solution for determining this rotated working plane.

The tabulated calculation 235 given on the seventh row of the Universal Square™ 100 provides the ratio of this rotated angle to one (1) for all hip and valley roof systems having pitches ranging from 2/12 to 18/12. The process for determining this rotated angle on the Universal Square™ is identical to that provided in the previous example. Take for example an equal pitched compound roof system having a 9/12 pitch. Transferring layout lines from one side of the hip/valley rafter to the opposite side begins with first laying out a plumb line (or lines) on one side face and then transferring this line (or lines) across the top and bottom faces to the opposite side face. The tabulated calculation 235 given on the seventh row of the equal rafter table 205 in the column under the unit of measurement 235 represented by the number nine (9) is 0.8835. Just as in the previous example, this indicates an angular rotation in the ratio of 0.8835:1.

Moving the decimal place one point to the right to identify one location on the tongue scale 310 between alignment indicia 317 and using a unit of measurement 215 indicated by the number ten (10) on the opposite side enables a user to readily align the Universal Square™ 100 with the hip or valley rafter and mark the angle across the top face of the hip or valley rafter. This is done by simultaneously aligning the indicia 317 represented by 8.835 on the tongue 300 and using a unit of measurement 215 indicated by the number ten (10) on the body 200. Marking a line along the body 200 to the opposite side of the beam enables a user to draw plumb lines down the opposite face. Repeating the same step across the bottom face of the hip or valley rafter enables full transference of layout lines.

Returning again to FIG. 2A, the eighth row of the equal pitch rafter table 205 provides tabulated calculations 235 for the purlin side cut layout angle over one (1) inch. The purlin side cut angle, like the purlin-housing angle, is the product of a complicated rotation related to the valley pitch and the backing angles. Determining this angle through math alone typically requires not only strong geometry and trigonometry skills, but also a strong working experience and understanding of compound roof systems, all wedded with a talent to imagine and envision three-dimensional structures. The tabulated calculations 235 on the eighth row of the equal pitch rafter table 205 on the front face of the body 200 of the Chappell Universal Square™ 100 provide the ratio of the sides of the purlin side cut angle for any equal pitched compound roof system ranging from 2/12 to 18/12. Again, this is an angular ratio and applying the tabulated calculation 235 to a physical manipulation of the Universal Square™ 100 requires repeating the basic process steps provided in the previous example.

Take for example a compound roof system having a 6/12 common roof pitch. On the eight line row in the column of tabulated calculations 235 extending beneath the unit of measurement 215 represented by the number six (6), is the value 0.4472. This is the angular rotation of the side cut angle in a ratio of 0.4472:1. Applying this angle to the purlin once again requires moving the decimal one place to the right and using this value over ten (10). Laying out the purlin requires placing the square on the side face with the indicia 317 represented by 4.472 on the front face of the tongue 300 aligned simultaneously with the unit of measurement 215 represented by the number ten (10) on the body 200. Drawing a line along the tongue 300 of the square marks the accurate purlin side cut angle. The value given on the Universal Square™ 100 is the tangent of the purlin side cut angle. Calculating the inverse of the tangent produces the degrees of the angle.

Returning again to FIG. 2A, the ninth row of the equal pitch rafter table 205 provides tabulated calculations 235 for the hip or valley backing or bevel angle and for the jack rafter and purlin top cut saw angle. First, with regard to the hip or valley backing/bevel angle, the typical approach to calculating this angle requires executing calculations in multiple rotations, which require both strong math and visualization sills. For this reason, the backing angle has remained a little understood aspect of compound roof framing. In timber framing, the backing angle becomes one of the most important elements to understand, and is the key to understanding the design, layout and execution of mortises and tenons.

The Chappell Universal Square™ 100 essentially takes the mystery out of the backing angle and provides tabulated calculations 235 that are available for use with any compound roof system with a pitch from 2/12 to 18/12.

The ninth and bottom row of the present embodiment of the equal pitch rafter table 205 on the front face of the body 200 provides the backing angle in degrees. In the column of tabulated calculations 235 extending beneath the unit of measurement 215 represented by the number eighteen (18), the backing angle for an 18/12 equal pitched compound roof system is 36.04 degrees. Under 10, the value is 26.92 degrees, and under 12, 30 degrees. This angle is applicable to a number of different applications in the roof system in various forms, but fundamentally enables alignment of the saw set to cut the backing or bevel angles on the hip or valley. The Universal Square™ 100 also provides the depth of the backing angle, which is used to mark the line along the length of the hip or valley. That tabulated calculation is provided aside the heading for the fourth row of the equal pitch rafter table 205.

With regard to the jack rafter and purlin top cut saw angle, the backing angle also provides the top saw cut angle on the top of the jack rafters and purlins. This most commonly applies to the jack purlin, although this angle applies to both the jack purlin and jack rafter. Jack rafters are commonly laid out and cut along a plumb line on their side face because the angle of rotation (bisected footprint angle) of equal-pitched compound roof systems is always 45 degrees. For this reason, sawing on the side face along a common pitch plumb line with the saw set to a 45-degree angle is the most direct and easiest approach. For larger timbers laying out cut lines on all 4 faces and sawing around the timber may be necessary. In this case, the top cut saw angle of the jack rafter would be set to the backing angle and the top layout line would be in accordance with the previous description related to the first row of the equal pitch rafter table 205.

Turning now to FIGS. 3A, 3B, 5A and 5B, one embodiment of the Universal Square™ comprises the depicted unequal pitched rafter tables 305, 505 for use in constructing unequal pitched hip and valley roof systems, for example. Standard framing squares fail to provide a concise and logistical table for such construction because of the innumerable number of roof pitch combinations. For every possible main (principal) roof pitch, an equal number and unique set of angular rotations exist for the opposing (secondary) roof. This combination of the principal and secondary roof pitches necessitates a distinct table for each main roof pitch. To that end, each face of the tongue 300, the front face and the tongue back face 500, provides an unequal pitched roof table 305, 505 dedicated to a single main roof pitch indicated by a main pitch marking 330, 530 indicated on the front face and back face of the tongue 300 respectively.

For example, if the main pitch marking 330 represents a main roof pitch 12/12, secondary pitches are possible in a range of anywhere from 2/12 to 24/12 or more. More commonly, in practice, this range extends from a pitch of 4/12 to a pitch of 15/12. In the embodiment of FIGS. 3A and 3B, the unequal pitched roof table 305 on the front face of the tongue 300 reflects calculations based on a 12/12 main pitch marking 330 with secondary pitches ranging along the front face outer edge tongue scale 310 from 4/12 to 15/12. These secondary pitches are indicated by each unit of measurement 315 represented by a number indicating the rise value in inches over one foot, or 12 inches. A column of tabulated calculations 335 extends beneath each of these units of measurement 315 representing secondary pitch rise over 12 inches of run. In the embodiment of FIGS. 5A and 5B, the unequal pitched rafter table 505 on the back face of the tongue 300 provides calculations for a main roof pitch of 9/12, indicated by the main roof pitch marking 530, and secondary roof pitches ranging along the back face outer edge tongue scale 510 from 4/12 to 15/12. These secondary pitches are indicated by each unit of measurement 515 represented by a number indicating the rise value in inches over one foot, or 12 inches. A column of tabulated calculations 535 extends beneath each of these units of measurement 515 representing secondary pitch rise over 12 inches of run. While the depicted embodiments of the unequal pitch rafter tables 305, 505 specify main roof pitches of 9/12 and 12/12, a user may reverse the usage of the scales 310, 510 and use the secondary pitch unit of measurement 315, 515 as an indicator of the main roof pitch in all of the foregoing examples and still achieve the same accurate results. This ability to use the Universal Square™ dynamically provides up to 46 specific options for the most common combinations of roof pitches.

Additionally, to provide tables for the full array of unequal pitched roof combinations from 4/12 to 15/12, the Chappell Universal Square™ 100 is adapted to receive optionally attachable rules (not shown) bearing additional unequal pitch tables 305, 505 printed on one or both sides. In one embodiment, the complete set consists of five (5) double sided rules, and each rule comprises a scale 310, 312 that identically matches the scales 310, 312 on the tongue 300 of the Universal Square™ 100. In one embodiment, the rules comprise pins extending therefrom for seating within accurately placed receiver holes drilled through the tongue 300. In another embodiment, the rules and tongue 300 are provided with perfectly aligned holes through which a mechanical fastener (such as, for example, a screw, pin or rivet) may pass to affix the rule to the Universal Square™ 100. In addition to attaching to the tongue 300, each rule functions as a stand-alone, highly accurate rule.

Returning now to the embodiment of the Universal Square™ 100 depicted in FIGS. 3A, 3B, 5A and 5B, two columns of tabulated calculations 335, 535 extend below the units of measurement 315, 515 represented by numbers ranging from 4 to 15. These two columns of tabulated calculations 335, 535 are marked "A" and "B" from left to right above the columns. The column of tabulated calculations 335, 535 marked "A" gives the pertinent values as they relate to the main pitch marking 330, 530. For example, FIG. 3A depicts a main pitch marking 330 of 12/12. The 12/12 pitch is a constant in this unequal pitch rafter table 305. The variable is the pitch of the secondary roof. The tabulated calculations 335 in the column marked "B" provide pertinent values for the secondary roof pitch, in accordance with the unit of measurement 315 represented by the numbered inch marking above the columns A and B. For example, the tabulated calculations 335 for column B under the unit of measurement 315 represented by the number nine (9) would be relative to an unequal pitched roof system with a main pitch, A, of 12/12, and a secondary pitch, B, of 9/12. The tabulated calculations 335 in this column only apply to a pitch combination of 12/12 to 9/12. Similarly, the values under the unit of measurement 335 represented by the number fourteen (14) apply only to a pitch combination of 12/12 primary pitch and 14/12 secondary pitch. The Universal Square™ 100 enables a user to apply 14/12 as the main pitch and 12/12 the secondary pitch with equal accuracy, as long as the user maintains the A to B orientation pertaining to the tabulated calculations 335. In other words, the tabulated calculations 335 under column A will remain associated with a 12/12 pitch during any application of the Universal Square™ 100.

Turning now to the embodiment of the Universal Sgauare™ 100 depicted in FIGS. 3B and 5B, all of the value factors and ratio/dimensional rules, row-by-row and column-by-column are identical on the front face unequal pitch rafter table 305 and the back face unequal pitch rafter table 505. The following descriptions provide detailed instructions for applying the unequal pitch rafter tables 305, 505 during construction. What are provided here are enabling instructions for utilizing all of the tabulated calculations 335, 535 during construction.

The first row in the unequal pitch rafter tables 305, 505 provides tabulated calculations 335, 535 under column A related to hip or valley pitch in inches rise over one (1) inch of run and under column B related to the pitch degrees of a hip or valley rafter. In a compound system, the hip or valley rafter pitch tabulated calculation 335 is shared by both the primary and secondary roof pitches. Take for example a structure having a 12/12 main roof pitch and a 10/12 secondary roof pitch. The tabulated calculation 335 in the first row of column A under the unit of measurement 315 associated with the number ten (10) is 0.64. This specifies that for every inch (or any unit of one) of the hip or valley rafter run, the vertical rise is 0.64 inches. Moving the decimal one point to the right produces 6.4 inches (or any unit measure of one). Aligning the edge of the framing member with 6.4 on the outer edge tongue scale 310 and aligning the same edge of the framing member with the unit of measurement 315 represented by the number ten (10) on the body scale 210 enables a user to layout the hip or valley level and plumb cuts on the rafter. This holds true for any unequal pitch roof with a combination of 10/12 and 12/12 pitches, regardless of which pitch serves as the main roof pitch.

Worth noting again is the ease with which a user may manipulate the Universal Square™ 100 to apply the expansive tabulated calculations 335 directly during alignment of the Universal Square 100 with the edge of a framing member. This is in part because the body scales 210, 310 and tongue scales 310, 312 are divided by indicia 217 representing tenths of a unit of measurement 315; Moving the decimal place of a tabulated calculation 315 one tenth to the right enables a user to align the product value on one scale 210, 310 with the unit of measurement 215, 315 represented by the number ten (10) on the other scale 310, 210. No calculators or trigonometric calculations are required. For a carpenter following plans and marking timber during the construction of a frame, such direct application of the Universal Square™ 100 to framing members simplifies the construction process, improving accuracy and efficiency. Furthermore, the tabulated calculations 335 are provided in universal decimal format and apply directly to any unit of measurement. The calculations require no conversions between fractions of inches and other units of measurement, such as meters and millimeters.

Also worth noting are the extended scales 310, 510 provided on the depicted embodiment of the tongue 300 of Universal Square™. This wider range of units of measurement 315, 515 enables a user to multiply tabulated calculations and identify units of measurement 215, 315 within the parameters of the scales 210, 310 that represent the same ratio only at a different location along the body 200 and tongue 300. This is useful, for example, when working with wide timber. In the example given above, moving the decimal of the tabulated calculation 315 one place to the right and multiplying that value by two results in 12.8. Accordingly multiplying ten (10) by two produces twenty (20). The ratio 12.8:20 is equal to the ratio of 6.4:10, but now a user may align the indicia 317 represented by 12.8 on the tongue scale 310 and the unit of measurement 215 represented by 20 on the body scale 210.

The first row of the unequal pitch rafter table 305 also provides the pitches of hip or valley rafters in degrees. In the embodiment of FIGS. 3A and 3B, this value applies to any pitch with a main roof pitch of 12/12 and a secondary roof pitch pertaining to the any one of the units of measurement 315 represented by a number of inches over a base run of 12. For example, the angle listed under the unit of measurement represented by the number seven (7) is 26.742 degrees. This is the angle of the hip or valley rafter for an unequal compound roof system with combined common roof pitches of 7/12 and 12/12. These angles are applicable to hip and valley rafters with these combined roof pitches regardless of the buildings footprint dimensions, width, depth or rafter run or span.

Figure 11:
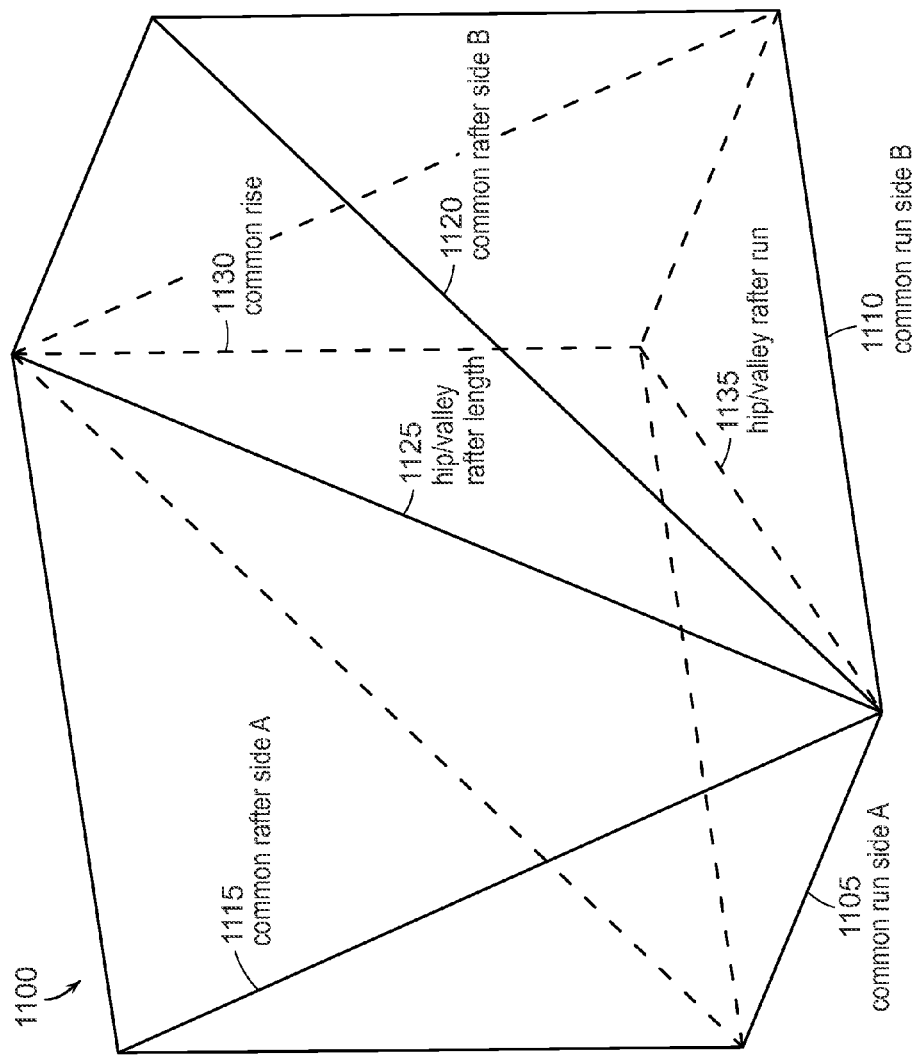
FIG. 11 depicts a schematic representation of framing member dimensions for a roofing system of unequal pitches.

Turning now to the second row item of the unequal pitch rafter table 305, 505, tabulated calculations 315, 515 are provided for hip or valley pitches in inches of rise over one (1) inch of run and the degree of a hip or valley pitch. FIG. 11 provides a diagram 1100 that assists with visualizing the relationships of the various angles and intersecting planes in a hip or valley roof system. The dashed lines illustrate the relationship of the hip/valley centerline as related to a hip roof system. The solid lines illustrate the same relationship with regard to a valley roof system. The lines shown are that common run side A 1105, the common run side B 1110, common rafter side A 1115, common rafter side B 1120, hip or valley rafter length 1125, common rise 1130 and hip or valley rafter run 1135.

Turning back to the second row item of the unequal pitch rafter table 305, 505 in the embodiment of the Universal Square™ 100 depicted In FIGS. 3A, 3B, 5A and 5B, the tabulated calculations 335, 535 on the second row provide the difference in common run A 1105 and common run B 1110.

Typically, compound roof designs provide only one of the common runs, leaving the user to compute the second run. The tabulated calculation 335, 525 in the second row of the unequal pitch rafter table 305, 505 provides the factor by which a user may determine the opposing common run from either side A or side B based on the one known value. This tabulated calculation 335, 535 is equal to the ratio of the common run side A 1105 measurement to the common run side B 1110 measurement. The tabulated calculation 335, 535 under column A provides the ratio of the common run side A 1105 to the common run side B 1110. If common run side A is known, multiplying the given run by the tabulated calculation shown produces the run of common run side B. Similarly, the tabulated calculation 335, 535 under column B provides the ratio of the common run side B 1110 to the common run side A 1105. If common run side B 1110 is known, multiplying the given run by the tabulated calculation shown produces the run of common run side A 1105. For example, for a roof system with a secondary pitch of 10/12 and a main pitch A with a common run of sixteen (16) feet, the value of the tabulated calculation 335 applicable to calculating the side B run is 1.2. Multiplying the known run, sixteen (16), by this factor produces a run of 19.2 feet. Again, the tabulated calculated value 335 is provided in decimal form and therefore applies to any unit of measurement 315 under any measurement system without requiring cumbersome conversions.

Turning now to the third row of the unequal pitch rafter table 305, 505, the third row of tabulated calculations 335, 535 provides the length of a hip or valley rafter per inch (or any unit of measurement 315, 515 of one (1)) of common rafter run for both sides A 1105 and B 1110. For example, in the embodiment of FIGS. 3A and 3B, for a secondary pitch of 6/12, the ratio of the common run A to the length of the valley rafter would be 1:2.449. For common run side B 1110, the ratio would be 1:1.226. Again, these tabulated calculations 335, 535 are values that serve as multiplication factors for determining an unknown run based on a known run. As with all tabulated calculations 335, 535 in decimal format, these multiplication factors apply to any unit of measurement within any measurement value system without complex conversions, for example, conversions from fractional values of an inch to millimeters.

The fourth row of the unequal pitch rafter table 305, 505 provides tabulated calculations 335, 535 for two values, the difference in length of the jack purlin per inch of common rafter length and the top layout of the purlin over one inch.

The values on the fourth row give the ratio of the length of the jack purlins per inch of common rafter length. Purlins run perpendicular to the common rafter, and their spacing measures from the plate or ridge along the common rafter. The following is an example of how to use these tabulated calculations 335, 535 in the fourth row of the unequal pitch rafter table 305, 505 to determine the difference between purlin length based on spacing. In the embodiment of FIG. 3A, the value of the tabulated calculation 335 under the unit of measurement 315 represented by the number seven (7) is a side A factor of 1.212. This side A factor corresponds, therefore, with a secondary pitch of 7/12. The corresponding side B factor provided by the tabulated calculation 335 under column B is 0.504. These values indicate that the difference in the length of the purlin relative to common run side A 1105 is 1.212 inches for every inch of spacing along the common rafter, and 0.504 for every inch of spacing for purlins relative to common run side B 1110. For a purlin spacing measurement of 30 inches on center on both sides A and B, for example, the difference in length between each purlin would be, respectively, 36.36 inches and 15.12 inches. These product values represent the difference in length for each purlin at the specified spacing of 30 inches.

The tabulated calculations 335, 535 on row four also apply to determining the top cut of the purlin. This is an angular ratio of the value given to 1. The angle is readily determined by moving the decimal point of the given tabulated calculation 335, 535 one place to the right to produce an alignment value. Aligning the edge of the purlin with the alignment value as positioned along tongue scale 310 of the Universal Square™ 100 and the unit of measurement 215 represented by the number ten (10) on the body scale 310 of the Universal Square™ 100 enables a user to marking the top of the purlin along the tongue 300 of the Universal Square™ 100 and produce an accurate line for the top cut angle.

For example if the primary pitch is 12/12 and the secondary roof pitch, i.e. side B, has a given pitch of 9/12, the tabulated calculation 335 in the fourth row under the unit of measurement 315 represented by the number nine (9) provides the factor by which a user may determine the angular ratio at which to mark the top cut of the purlin. Under the unit of measurement 315 indicated by the number nine (9), column A provides a tabulated calculation 335 of 0.9428 and column B provides a tabulated calculation 335 of 0.6. With regard to side A, moving the decimal place to the right produces 9.428. Aligning the edge of the purlin with the indicia 317 representing 9.428 on the scale 310 of the tongue 300 and with the unit of measurement 215 represented by the number ten (10) on the scale 210 of the body 200 enables a user to mark the purlin along the tongue 300 and accurately layout a cut mark on the top of the purlin relative to side A. With regard to side B, moving the decimal point of the tabulated calculation 335 to the right by one (1) place produces a value of six (6). Aligning the edge of the purlin with the indicia 317 representing six (6) on the scale 310 of the tongue 300 and with the unit of measurement 215 represented by the number ten (10) on the scale 210 of the body 200 enables a user to mark the purlin along the tongue 300 and accurately layout a cut mark on the top of the purlin relative to side B.

Turning now to the fifth row in the unequal pitch rafter table 305, 505, the tabulated calculations 335, 535 provide decimal factors for determining the difference in length of jack rafters per inch of spacing and for determining the top layout of a jack rafter over one (1) inch. In other words, the tabulated calculations 335, 535 on row five of the unequal pitch rafter table 305, 505 provide the ratio of the difference in the length of the jack rafters per inch of spacing along the plate or ridge beam. Rafters run perpendicular the plates and spacing is measured along the plate or ridge. The following is an example of how apply these tabulated calculations 335, 535 to determine the difference in the length of the jack rafters for any spacing distance.

With regard to the embodiment of the Universal Square™ 100 depicted in FIG. 3A, for a main pitch of 12/12 and a secondary pitch of 7/12, the fourth row tabulated calculation 335 is 0.825 for side A and 1.985 for side B. In other words, the difference in the length of the jack rafter for side A is 0.825 inches for every inch of spacing along the plate, and 1.985 for every inch of spacing along the plate in reference to side B. For a rafter spacing of 30 inches on center in both roof pitches, sides A and B, the difference in length between each jack rafter is determined by multiplying the spacing, 30 inches, by the respective tabulated calculations, 1.985 and 0.835. This produces a side A length difference of 24.75 and a side B length difference of 59.55 for jack rafters spaced 30 inches apart.

With regard to all length and angular ratio factors on the Chappell Universal Square™, a user may apply any unit of measure and achieve the same accurate results. For example, replacing 30 inches with 30 centimeters in the example above would result in an equally accurate measure expressed in centimeters without requiring a measurement unit conversion.

The tabulated calculations 335, 535 provided on row five also apply to determining the top cut of the jack rafter. This is an angular ratio of the given tabulated calculation 335, 535 to one (1). Moving the decimal point of the value of the given tabulated calculation 353,535 one place to the right determines the angle value. Aligning with the edge of the jack rafter the indicia 317 corresponding to this value along the tongue scale 310 and the unit of measurement 215 corresponding to the number ten (10) on the body scale 210 of the Universal Square™ 100, enables a user to mark the surface of the jack rafter along the tongue 300, thereby marking the top cut angle across the top of the jack rafter.

The Universal Square™ 100 readily defines the backing/bevel angle for both intersecting roof pitches on the sixth row of the unequal pitch rafter table 305, 505. The columns of tabulated calculations 335, 535 descending under the units of measurement 315, 515 from four (4) to fifteen (15) (the relative rise-per-inch of the secondary pitch) provide the backing angles for both side A and side B. These angles are available for straight forward application to a hip or valley rafter. With regard to the embodiment of FIGS. 3A and 3B, under the unit of measurement 315 indicated by the number ten (10), the backing angles for a roof system with a combination 12/12 main pitch and a 10/12 secondary pitch are 32.903 degrees for side A and 24.19 degrees for side B. These angles are the angles at which to set a saw to cut/rip the angles along the hip or valley rafter.

The backing and bevel angles always generate from a vertical centerline of the timber and slope outward toward the side faces. Two lines of different sloping angles generated from a point along a vertical plane centerline of a timber will intersect the side faces at different elevations. In equal pitched roof systems, both angles will intersect at the same elevation because the angles are equal. In unequal pitched systems, because the angles differ, the bevels will intersect the side face of the timber at different elevations.

The total depth of the backing angle for any hip or valley rafter is equal to the depth of the greater angle. The shallower angle will generate from this point on the centerline to intersect with the outside face of the beam at some point lower than the corner. From this point a user will draw a line parallel to the top of the beam and along the length of the rafter. This is the actual cut line along the side face of the rafter and setting the saw set to the designated backing angle enables a user to make this cut.

The depth of the backing or bevel angle is a function of the tangent. Calculating the depth using trigonometry requires multiplying half the width of the timber by the tangent of the steeper backing angle. This produced the depth in inches for a width supplied in inches. For example, as shown in the embodiment of FIGS. 3A and 3B, for a primary pitch of 12/12 and a secondary roof pitch of 10/12, the angle relative to side A is the steeper pitch at 32.903 degrees. The tangent of 32.903 degrees is 0.647. For a hip or valley rafter having a width of 6 inches, the depth of the backing angle is half the width multiplied by the tangent value. Here, that calculation would equal 1.941.

The same process applies to finding the shallower pitch. Subtracting the results for the shallower angle from the results of the greater angle produces the distance from the top edge that the angle will intersect the outside face. This is the cut line on that side face of the hip or valley rafter. Using the same example, the backing angle for side B is 24.19 degrees and the tangent of this angle is 0.4492. Multiplying half the timber width by the tangent yields a factor of 1.347. Subtracting the side B factor of 1.347 from the side A factor of 1.941 yields 0.594. The cut line of side B therefore is located 0.594 inches down from the top of the hip or valley rafter.

The tabulated calculation 335, 535 in the sixth row enables a builder to make top cuts on the jack purlins or rafters by cutting along the layout line previously described with the saw set to the appropriate backing angle as specified in accordance with the angles listed under the appropriate roof pitches for a particular roof system.

Turning now to the seventh row of the unequal pitch rafter table 305, 505, the tabulated calculations 335, 535 represent angular ratios that compensate for rotations and thereby provide side face layout angle for jack purlins to hip or valley rafters. The tabulated calculations listed for sides A and B are in a ratio to one (1). As in previous examples employing decimal values of tabulated calculations 334, 535, using these ratios on the Universal Square 100 to lay out the jack purlin side faces requires mentally moving the decimal point of the tabulated calculation 335, 535 to the right one place and aligning the indicia 317, 517 on the tongue scale 310 for that value with the edge of the jack purlin while simultaneously aligning the unit of measurement 215 represented by the number ten (10) on body scale 310.

The following is an example referencing the embodiment of FIGS. 3A and 3B having a primary roof pitch of 12/12. For a secondary rafter with a pitch of 14/12, the values for sides A and B are 0.6061 and 0.8858. Setting the Universal Square™ 100 to lay out the side face of the purlin for side A requires mentally moving the decimal to the right one place and aligning the indicia 317 represented by 6.061 on the tongue scale 310 and the unit of measurement 215 indicated by the number ten (10) on the body scale 210. Marking a line in the purlin, along the edge of the tongue 300 produces an accurate layout line for the purlin side cut. Laying out the purlin for side B requires repeating the same process using 8.858 over ten (10) and marking along the edge of the tongue 300 to make the accurate side layout cut line.

In the present embodiment of the Universal Square™ 100, the eighth row of the unequal pitched tables 305, 505 provides tabulated calculations 335, 535 representing housing angle values. Like the side cut angles, these tabulated calculations are angular ratios that will produce the angle of the purlin housing on the side face of the hip or valley rafter. This angle will be scaled off of a line drawn perpendicularly to the top face of the hip or valley. For example, in the embodiment of FIGS. 3A and 3B, in the column of tabulated calculations 335, 535 listed under the unit of measurement represented by the number fourteen (14), the corresponding tabulated calculations 335 are 0.2789 for side A and 0.4377 for side B. Using the same approach of moving the decimal point to the right by one place to identify an indicia 317 for alignment on the tongue 300 and aligning the unit of measurement 215 represented by ten (10) on the body scale 210 provides a side A ratio of 2.789:10 and a side B ratio of 4.377:10. Placing the Universal Square™ 100 on the rafter so as to align these two points on the respective scales 310, 210 along the top edge of the rafter enables a user to mark the layout line on the rafter along the edges of tongue 300. This produces an accurate layout line corresponding to the purlin-housing angle.

Turning now to the embodiment of the Universal Square™ 100 depicted in FIGS. 4A and 4B, the following descriptions provide representative instructions for applying the polygon rafter table 405 during construction. Because application of the decimal and angular tabulated calculations 435 is similar to application of decimal and angular calculations discussed with regard to the equal pitch rafter table 205 and unequal pitch rafter tables 305, 505, the following description and example is merely a single representation of the myriad information provided in the polygon rafter table 405. As indicated at the outset, the depicted embodiment of the polygon rafter table 405 provides the following values for 6 and 8 sided polygons with common pitch ratios of 2/12 to 18/12:1) hip/valley rafter pitch in rise over one (1) inch of run, 2) length of common rafters per one (1) inch of side length, 3) difference in length of jack rafters per inch of spacing, 4) length of hip/valley per one (1) inch of side length, 5) difference in length of jack purlins per one (1) inch of spacing, 6) backing and bevel angles in degrees, 7) jack rafter and purlin top cut saw angle, 8) jack purlin side cut angle, 9) jack purlin housing angle, 10) hip and valley side layout angle to purlin header, and 11) depth of bevel and backing angles per inch of hip width.

In the embodiment of FIG. 4, the Universal Square™ 100, for the first time in the history of framing squares, includes a complete polygon rafter table 405 for two of the most common polygons; hexagons and octagons. While previous squares only have included values to determine the miter angle or sidewall angles for polygons, the Universal Square™ 100 provides a complete polygon rafter table 405 for polygonal structures of 6 and 8 sides having common roof pitches ranging from 2/12 to 18/12. The polygon rafter table 405 table includes the ratios of all member lengths and provides easily applied values for all angles including bevel cuts, housing angles, side and top cuts for jacks. These tabulated calculations 435 are provided in an easily used table and in a format based on ratios to a unit measure of one (1).

The polygon rafter table 405 is on the back face of the body 200 of the Universal Square™ 100. The table 405 provides tabulated calculations 435 in two columns descending beneath the units of measurement 415 indicated by numbers ranging from two (2) to eighteen (18). The two columns of tabulated calculations 435 listed below each unit of measurement 415 are headed with the number six (6) and eight (8) respectively to represent tabulated calculations 435 corresponding to hexagons and octagons.

With regard to six sided polygons, or hexagons, the left hand column of tabulated calculations 435, marked by the number six (6), provides all the information in the roof system pertinent to a six-sided polygon. The unit of measurement 415 on the scale 410 above the column of tabulated calculations 435 indicates the given common roof pitch in inches of rise per foot of run. This will dictate the actual angular and dimensional criteria for that specific pitch in the column of tabulated calculations 435.

With regard to eight sided polygons, or octagons, the column on the right, marked by the number eight (8), provides all information in a roof system pertinent to an eight-sided polygon. The unit of measurement 415 on the scale 410 above the column indicates the given common roof pitch in inches of rise per foot of run. This will dictate the actual angular and dimensional criteria for that specific pitch in the column of tabulated calculations 435.

One example of a dimensional factor provided by the tabulated calculations 435 in the polygon rafter table 405 is the length of common rafter per inch of side length found in the third row of the polygon rafter table 405. The standard dimensional attributes applied to building polygons are 1) the lengths of the sides, and 2) the common roof pitch. Because the plan view angular ratios and geometry of any given polygon are the same regardless of its size (i.e. the footprint triangles are all similar triangles), the side wall length is usable in conjunction with the common roof pitch to determine all other aspects of the roof system.

In a polygon the common rafter run is perpendicular to the side walls with the maximum run of the common rafter extending perpendicularly from the center point of each side. The center points of the common rafters all intersect at a center point of the polygon determined by the side length divided by two. To allow the rapid calculation of common rafter lengths, the Universal Square™ 100 provides a tabulated calculation 435 based on the ratio of the rafter length to one (1) unit of side length. Because of the geometric relationships of polygons, the maximum length of any common rafter extends from the exact center point of the sides. Therefore, when working with the tabulated calculations 435 specified in the third row of the polygon rafter table 405, the maximum length will always be no greater than the side length divided by two.

The tabulated calculation 435 provided on the third row of the polygon rafter table 405 provides the dimensional ratio of the common rafter length per one (1) inch of side length. As an example, for a six-sided polygon with a given common pitch of 15/12, the tabulated calculation 435 in the left column under the unit of measurement 415 represented by the number fifteen (15) is 2.773. For every inch of side length, the common rafter length for a six-sided polygon with a common roof pitch of 15/12 would be 2.773 inches, or a ratio of 1:2.773. This ratio applies to any similar hexagon regardless of side length. Additionally, the ratio applies to any system measure including metric.

Take as a further example a hexagon with a side length of 12 feet (144 inches) and a common pitch of 10/12, wherein the common rafters are spaced at 20 inches on center as measured starting from the center of the side wall. The length of the central common rafter at the center point of the side wall and the difference in length for each jack rafter are computable based on the common length ratio for a 10/12 pitch hexagon, which is 2.255. The relative wall length for the central common rafter is the side length of 144 inches divided by two (2). This length therefore is 72 inches. The length of the central common rafter is then 72 multiplied by the tabulated calculation 435 of 2.255, yielding a product of 162.36 inches. The difference in length of jack rafters at 20 inch spacing on center is 20 multiplied by the tabulated calculation 435 of 2.255, for a product of 45.1 inches.

The preceding examples collectively describe the scope of uses for one embodiment of the present invention bearing the markings, text and indicia as herein described. Other embodiments of the Universal Square™ 100 may provide a subset of the tabulated calculations or extended scales bearing extended tabulated calculations. Worth noting again is the universal applicability of the Universal Square™ 100 based on the ratios relative to a unit of one (1) or 10. All of the angular and dimensional values on the Chappell Universal Square™ 100 are based on ratios relative to the unit of one (1) (or 10), and therefore are interchangeably applicable to either Standard/Imperial or Metric units of measure. Applying the tabulated calculations 235, 335, 435, 535 to centimeter measurement produces the same accurate results as applying the same to inch measurements. The scope and breadth of the tabulated calculations and graduated scales marked in tenths on the Universal Square™ 100 provide heretofore unavailable efficiency and accuracy during construction of compound framing systems.

The only difference requiring consideration during use across measurement systems is the designation for the originating roof pitch. In the United States, the standard system used to designate roof pitch (angle of inclination) is based on the relationship of rise (in inches) to the run (based on the constant of one (1) foot or 12 inches). Therefore, roof pitches are expressed as fractions having a denominator of twelve (12), e.g. 9/12, 10/12, 12/12, which respectively represent nine (9) inches, ten (10) inches or twelve (12) inches of rise for every foot (12 inches) of run. The run of one (1) foot remains constant and the variable value is the rise, the pitch ratio numerator. The degree of inclination of the roof is then determinable through trigonometry based on the given rise and run provided in ratio form.

The most common method for specifying roof pitch in countries using the metric system comprises giving the angle of inclination directly in degrees, typically provided as whole numbers such 25 degrees, 30 degrees, 35 degrees, etc. Applying this angle to a framing member to lay out the angle of inclination requires an angle gauge or protractor. Alternatively, a builder may convert the angle to a rise to run ratio and use a square. As an example, a 30 degree angle would translate to a 6.92:12 pitch. The Universal Square™ 100 is compact and easy to use in the field to lay out angles rapidly and accurately. By adapting the degree of roof pitch to a rise to run ratio, a builder may employ the Chappell Universal Square™ 100. All subsequent dimensional and calculated values determined by using the tabulated calculations 235, 335, 435, 535 therefore apply to the metric system with absolute accuracy.

FIG. 12 provides a conversion table 1200 of common roof pitches 1205 expressed in rise to run pitch ratios 1210 and angular pitch in degrees 1215, wherein the degree values are the closest degree equivalent most commonly used for roof pitches in metric based systems. All of the tabulated calculations 235, 335, 435, 535 on the Chappell Universal Square™ 100 are based on the rise to run pitch ratio 1210. Applying the Universal Square™ 100 to construction using metric units requires identifying a rise to run pitch ratio 1210 that most closely matches the angular pitch given in degrees 1215. For example, in accordance with FIG. 12, a 30 degree roof pitch 1217 most closely matches a 7/12 rise to run pitch ratio 1212 on the Chappell Universal Square™ 100. A user may then apply all dimensional and angular tabulated calculations 235, 335, 435, 535 on the Universal Square™ 100 associated with a 7/12 pitch to units of millimeters, centimeters or meters, for example, with absolute accuracy.

In other words, the pitch ratio denominators may represent units of centimeters instead of inches, and the tabulated calculations 235, 335, 435, 535 nonetheless produce accurate results. For example, the units of rise may be applied to a constant run of 12 centimeters instead of 12 inches. So, a pitch of nine (9) centimeters of rise over twelve (12) centimeters of run produces the same angular pitch in degrees 1215 and rise to run ratio pitch 1210 as nine (9) inches of rise over twelve (12) inches of run. The pitch ratio is universal and only the units of application differ. In other examples depicted in the conversion table 1200, a given pitch of 25 degrees translates to a 6/12 pitch ratio, and a 40 degree pitch translates to a 10/12 pitch ratio. A 50 degree pitch translates to a 14/12 pitch ratio. Using these pitch ratios in place of degrees produces an equivalent roof angle, differences between which would be imperceptible with regard to form and proportion, even to the most astute eye.

The Universal Square™ 100 is preferably manufactured of steel or a similarly firm material capable of withstanding expansion and warping under varying weather conditions and capable of withstanding extended wear and tear without bending, warping, twisting, etc. In some embodiments, the Universal Square™ 100 may be manufactured of a lightweight composite material capable of molding into a defined straight edge. In other embodiments, the Universal Square™ may be manufactured from other light weight and resilient metals or plastics such as but not limited to aluminum, PVC, stainless steel, magnesium alloy, or polycarbon fiber. In all embodiments, the Universal Square™ 100 is manufactured of a lightweight material capable of providing a true straight edge and capable of withstanding environmental conditions that may cause the tool to expand or contract, thereby altering the reliability of the indicia and scales marked thereon.

The information described and illustrated herein pertaining to the Chappell Universal Square™ 100 reflects only the first and primary level of measurement data that a user, such as an individual in the field of carpentry and the building trades, may apply during on-site construction of framed structures of wood or steel. These primary measurement data require no formal math training and only a simple calculator or pencil skills for making rudimentary mathematical calculations. The Chappell Universal Square™ 100 requires no complex trigonometric calculations or unit system conversion calculations during application of the tool in combination with the uniquely aligned and uniquely presented tabulated measurement data. A user may derive a profound number of resulting calculations from the scales and aligned data tables presented on the Universal Square™ 100. For example, architects, engineers, and carpenters who have a deeper understanding of mathematics and trigonometry may apply the Universal Square™ when determining building angles that exceed those listed on the scales and tables of the embodiment of the present invention herein described. Many of these building angles are determinable via clear and distinct formulas that never have been available before for use with direct application of a square and indicia thereon. The content and layout of content supplied on the Universal Square™ now makes such direct application and calculation in the field possible.

It is noted that the foregoing examples have been provided merely for the purpose of explanation and are in no way to be construed as limiting of the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

I claim:

1. A universal framing square for use in constructing compound framing systems of equal and/or unequal pitch, comprising:

a) a planar body member comprising first body indicia on at least a first face thereof,
  wherein the first body indicia comprise:
   i. a first body scale incremented in tenths of a unit of measurement,
   ii. an equal pitch rafter table comprising decimal calculations and/or angle calculations provided in columnar format in alignment with each unit of measurement, and
   iii. a number associated with each unit of measurement and indicative of the equal pitch rise to which each column of the equal pitch rafter table applies; and b) a planar tongue member integrally formed with the planar body member and oriented within the same plane at a 90 degree angle from the planar body member, the planar tongue member comprising first tongue indicia on at least a first face thereof,
wherein the first tongue indicia comprise:
  i. a first tongue scale incremented in tenths of a unit of measurement identical to the first body scale unit of measurement,
  ii. a first unequal pitch rafter table of decimal calculations and/or angles provided in columnar format in alignment with each unit of measurement representing the rise of an unequal pitch ratio, wherein the decimal calculations and/or angles apply to the specific pairing of each unequal pitch ratio with a fixed front face primary pitch ratio,
  iii. a marking of a front face primary pitch ratio to which the decimal calculations and/or angles in the first unequal pitch rafter table applies, and
  iv. a number associated with each unit of measurement and indicative of the secondary pitch rise to which each column of the first unequal pitch rafter table applies and
wherein a selected indicia on the first body scale and a selected indicia on the first tongue scale simultaneously align with an edge of a framing member forming framework of equal and/or unequal pitch such that marking along the blade of the body and/or blade of the tongue the position for cutting the framing member in accordance with a value determined by the unequal pitch rafter table and/or equal pitch rafter table requires no additional trigonometric calculations.

2. The universal framing square of claim 1 wherein every pitch run is 12.

3. The universal framing square of claim 1, further comprising second body indicia on second face of the planar body member, wherein the second body indicia comprise
  a) a second body scale incremented in tenths of a unit of measurement,
  b) a number associated with each unit of measurement and indicative of the roof pitch rise to which each column of the equal pitch rafter table applies; and
  c) a polygon table comprising decimal calculations and angles provided in columnar format in alignment with each unit of measurement for a specifically marked number of polygon sides.

4. The universal framing square of claim 3, further comprising second tongue indicia on a second surface of the planar tongue member, wherein the second tongue indicia comprise:
  a) second tongue scale incremented in tenths of a unit of measurement identical to the second body scale unit of measurement,
  b) a second unequal pitch rafter table of decimal calculations and/or angles provided in columnar format in alignment with each unit of measurement representing the rise of an unequal pitch ratio, wherein the decimal calculations and/or angles apply to the specific pairing of each unequal pitch ratio with a fixed back face primary pitch ratio,
  c) a marking of the a back face primary pitch ratio to which the second unequal pitch rafter table applies, wherein the back face primary ridge pitch ratio differs from the front face primary ridge pitch ratio.

5. The universal framing square of claim 3 wherein the second body scale and second tongue scale are disposed on the edge of the planar body member and the edge of the planar tongue member so as to enable simultaneous alignment of the second scales with structural elements forming framework of unequal pitch.

6. The universal framing square of claim 1 wherein the decimal and/or angle calculations in the equal pitch rafter table, first unequal pitch rafter table and the second unequal pitch rafter table are universally applicable to standard measurement systems and metric measurement systems.

7. The universal framing square of claim 1 wherein the equal pitch rafter table comprises decimal calculations associated with length of a common rafter per one measurement unit of run.

8. The universal framing square of claim 1 wherein the equal pitch rafter table comprises decimal calculations associated with length of hip or valley rafter per one unit of common run and wherein the same decimal calculations enable the calculation of a difference in length of successive jack purlins per one unit of common length.

9. The universal framing square of claim 1 wherein the equal pitch rafter table comprises decimal calculations associated with depth of a bevel cut per one unit of hip or valley width and wherein the same decimal calculations enable layout of a housing angle for a purlin joining to hip or valley over one unit of measurement.

10. The universal framing square of claim 1 wherein the equal pitch rafter table comprises decimal calculations associated with housing angle for a hip or valley rafter to a principal rafter or plate over one unit of measurement.

11. The universal framing square of claim 1 wherein the equal pitch rafter table comprises decimal calculations associated with laying out cuts in a working plate joining the top of a hip or valley rafter over one unit of measurement and wherein the decimal calculations enable laying out a purlin side cut angle over one unit of measurement.

12. The universal framing square of claim 1 wherein the equal pitch rafter table comprises angle calculations associated with hip or valley backing angle.

13. The universal framing square of claim 1 wherein the critical dimensions table comprises decimal calculations associated with hip or valley pitch rise over one unit of run.

14. The universal framing square of claim 1 wherein the critical dimensions table comprises decimal calculations associated with difference in length of run side A to side B per one unit of measurement.

* * * * *

UNITED STATES PATENT AND TRADEMARK OFFICE
CERTIFICATE OF CORRECTION

| | |
|---|---|
| PATENT NO. | : 7,958,645 B1 |
| APPLICATION NO. | : 12/724943 |
| DATED | : June 14, 2011 |
| INVENTOR(S) | : Steve K. Chappell |

It is certified that error appears in the above-identified patent and that said Letters Patent is hereby corrected as shown below:

In the Claims

Column 25, line 52, "a) second" should read --a) a second--.

Column 26, line 7, delete "ridge";

Column 26, line 8, delete "ridge";

Column 26, line 9, "3" should read --4--;

Column 26, line 13, "second scales" should read --second body scale and second tongue scale--;

Column 26, line 15, "1" should read --4--.

Signed and Sealed this
Twenty-seventh Day of October, 2015

Michelle K. Lee
*Director of the United States Patent and Trademark Office*